United States Patent [19]

Minami et al.

[11] Patent Number: 5,796,425
[45] Date of Patent: Aug. 18, 1998

[54] ELIMINATION OF THE EFFECT OF DIFFERENCE IN VERTICAL SCANNING FREQUENCY BETWEEN A DISPLAY AND A CAMERA IMAGING THE DISPLAY

[75] Inventors: Kouji Minami; Akira Hitotsumatsu, both of Tokyo, Japan

[73] Assignee: Mitsubishi Denki Kabushiki Kaisha, Tokyo, Japan

[21] Appl. No.: 646,401

[22] Filed: May 9, 1996

[30] Foreign Application Priority Data

| May 16, 1995 | [JP] | Japan | 7-117287 |
| Jun. 1, 1995 | [JP] | Japan | 7-135078 |

[51] Int. Cl.$^6$ .................................................. H04N 17/00
[52] U.S. Cl. ........................ 348/181; 348/189; 348/512; 348/547
[58] Field of Search ................................. 348/180, 181, 348/189, 190, 500, 510, 512, 536, 547; H04N 17/00

[56] References Cited

U.S. PATENT DOCUMENTS

| 5,233,419 | 8/1993 | Lee | 348/181 |
| 5,440,340 | 8/1995 | Tsurutani et al. | 348/190 |
| 5,473,394 | 12/1995 | Hideyuki | 348/190 |
| 5,677,732 | 10/1997 | Moon | 348/190 |

FOREIGN PATENT DOCUMENTS 5-30544  2/1993  Japan.

OTHER PUBLICATIONS

Record of the 1995 Kansai–Section Joint Convention of Institutes of Electrical Engineering, Japan, pp. 19 and G415 (Nov. 1995).

*Primary Examiner*—Bryan Tung

[57] ABSTRACT

An imaging system that images a raster-scanned display receives the vertical synchronizing signal of the raster-scanned display, and has a synchronizing signal generator for generating the vertical synchronizing signal of the imaging system. According to a first aspect of the invention, the output of the imaging system is multiplied by a compensation signal that compensates for brightness differences due to a difference in frequency between the two vertical synchronizing signals. According to a second aspect of the invention, the vertical synchronizing signal of the imaging system is delayed from the vertical synchronizing signal of the raster-scanned display by an amount calculated so that no such brightness difference occurs in the part of the raster-scanned display viewed by the imaging system.

18 Claims, 19 Drawing Sheets

ELIMINATION OF THE EFFECT OF DIFFERENCE IN VERTICAL SCANNING FREQUENCY BETWEEN A DISPLAY AND A CAMERA IMAGING THE DISPLAY

BACKGROUND OF THE INVENTION

The present invention relates to a system for imaging a raster-scanned display, and a system for adjusting a device that produces a raster-scanned display.

Systems of this type are employed to facilitate the setting up of video projectors. A video projector forms an image on a raster-scanned cathode-ray tube (CRT), or forms red, green, and blue images on three such CRTs, and projects the image or images onto a screen. Necessary adjustments include, for example, focusing and color registration. The adjustment process can be automated by having the video projector display test patterns on the screen, imaging the test patterns with a video camera, and processing the test-pattern images to generate adjustment commands.

A problem occurs when the video projector and video camera have different vertical scanning frequencies. Depending on the frequency relationship, while the video camera is capturing one test-pattern image, the electron beam or beams in the video projector may scan some parts of the test pattern more often than other parts, causing the parts scanned more often to appear brighter. As a result, the test-pattern image is not processed correctly, and wrong adjustments are made.

This problem is quite common, because the video camera is normally driven at a standard television scanning frequency, such as the frequency specified by the National Television System Committee (NTSC), while the video projector is generally a multiscan or autoscan device supporting a variety of video formats and scanning frequencies, and test patterns are often generated in a format with a non-television scanning frequency.

The same problem occurs when a video camera attempts to capture an image displayed on a computer monitor screen, which usually has a higher vertical scanning frequency than does the camera. The image of the monitor screen is often rendered useless by a flickering pattern of bright and dark bands. Similar problems occur whenever an imaging system operating at one vertical scanning frequency is used to image a raster-scanned display having a different vertical scanning frequency.

For still images, one known solution to the above problem is to store a plurality of frames of the same image, and for each picture element or pixel, to use the maximum (or minimum) value appearing in the plurality of frames. This solution is disadvantageous in that acquiring the necessary number of frames takes time.

Another known solution equalizes the frame or field exposure time of the video camera to the frame or field rate of the raster-scanned display by disabling the exposure process for part of each frame or field in the video camera. This solution fails, however, when the video camera has a faster vertical scanning frequency than the raster-scanned display.

These known solutions also fail to address a second problem, which is that the central part of a raster-scanned display generally appears brighter than the peripheral parts.

SUMMARY OF THE INVENTION

An object of the present invention is accordingly to compensate for brightness differences caused by an arbitrary difference in vertical scanning frequencies between a raster-scanned display and an imaging system that images the raster-scanned display.

Another object is to compensate for brightness differences caused by a central-peripheral brightness gradient on the raster-scanned display.

A more specific object is to enable an imaging system to image a test pattern displayed on a raster-scanned display having an arbitrary vertical scanning frequency quickly and correctly.

A further object is to provide an imaging and adjustment system for quickly and accurately adjusting a raster-scanned display system having an arbitrary vertical scanning frequency, when the raster-scanned display system is set up.

Another object is to enable an imaging system to image a scene correctly when a raster-scanned display forms one part of the scene.

The invented imaging system receives a vertical synchronizing signal from a display system that produces a raster-scanned display, and has an imaging device that converts an optical image, in which at least part of the raster-scanned display appears, to a video signal. A vertical synchronizing signal is supplied to the imaging device by a synchronizing signal generator. On command from a central processing unit, the synchronizing signal generator resets the imaging device's vertical synchronizing signal at a time synchronized with the display system's vertical synchronizing signal.

According to a first aspect of the invention, the central processing unit calculates a two-valued compensation function from the vertical scanning frequencies of the display system and imaging device, and supplies data defining this two-valued compensation function to a compensation signal generator. The compensation signal generator responds by generating a compensation signal that compensates for brightness differences due to differing vertical scanning frequencies of the display system and imaging device. A multiplier multiplies the video signal by the compensation signal.

The compensation signal preferably also compensates for a brightness gradient between the central and peripheral parts of the raster-scanned display. The correction factors that compensate for this brightness gradient may be obtained by measurement of a test pattern, or by calculation from theory. The correction factors may be pre-stored in a memory.

According to a second aspect of the invention, the imaging system views only part of the raster-scanned display. The central processing unit calculates a delay, and commands the synchronizing signal generator to delay the imaging device's vertical synchronizing signal from the display system's vertical synchronizing signal by the calculated amount at a designated time. The delay is calculated so that the part of the raster-scanned display viewed by the imaging system at a certain time after the designated time is free of brightness differences due to the different vertical scanning frequencies of the display system and imaging device.

According to a third aspect of the invention, there is no difference between the vertical scanning frequencies of the display system and imaging device, and the central processing unit simply commands the synchronizing signal generator to synchronize the imaging device's vertical synchronizing signal to the vertical synchronizing signal of the display system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Embodiments of the invention will be described with reference to the attached illustrative drawings.

First Embodiment

Figure 1:
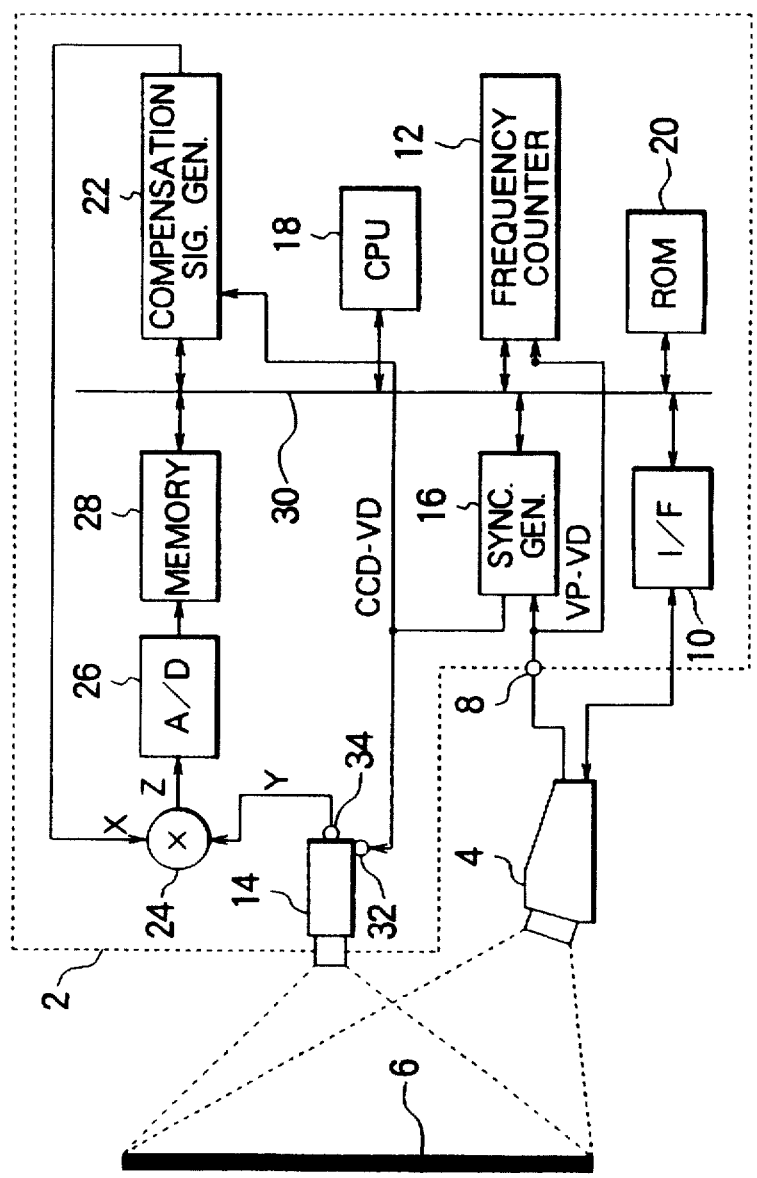
FIG. 1 is a block diagram illustrating a first embodiment of the invention.

As a first embodiment of the invention, FIG. 1 shows a block diagram of an imaging system 2 used for adjusting a video projector 4 that produces a raster-scanned display on three internal CRTs (not visible), and projects the raster-scanned display onto a screen 6. The imaging system 2 has a timing input terminal 8 for receiving a first vertical synchronizing signal, denoted VP-VD, from the video projector 4, and an interface circuit 10 for other communication with the video projector 4.

Further elements of the imaging system 2 include the following: a frequency counter 12 that measures the frequency $f_{VSIG}$ of the first vertical synchronizing signal VP-VD; a video camera 14 that forms an optical image of the raster-scanned display on an internal charge-coupled device (CCD, not visible), and converts the optical image to an analog video signal Y; a synchronizing signal generator 16 that generates a second vertical synchronizing signal denoted CCD-VD; a central processing unit or CPU 18 that controls the imaging system 2 and, via the interface circuit 10, the video projector 4; a read-only memory (ROM) 20 that stores a control program executed by the CPU 18; a compensation signal generator 22 that generates a compensation signal X having values computed by the CPU 18; a multiplier 24 that multiplies the video signal Y by the compensation signal X to produce a compensated video signal Z; an analog-to-digital converter 26 that digitizes the compensated video signal Z; a read-write memory 28 capable of storing at least one frame of the digitized, compensated video signal Z; and a bus 30 for communication among the interface circuit 10, frequency counter 12, synchronizing signal generator 16, CPU 18, compensation signal generator 22, and read-write memory 28.

The first vertical synchronizing signal VP-VD is supplied from the timing input terminal 8 to the frequency counter 12 and synchronizing signal generator 16. The second vertical synchronizing signal CCD-VD is supplied from the synchronizing signal generator 16 to the video camera 14 and compensation signal generator 22. The synchronizing signal generator 16 also supplies the video camera 14 and compensation signal generator 22 with a horizontal synchronizing signal, not explicitly indicated in the drawing. The video camera 14 has an external timing input terminal 32 for input of vertical and horizontal synchronizing signals, and a video output terminal 34 for output of the video signal Y.

The three CRTs in the video projector 4 produce independent red, blue, and green raster-scanned images. These images are projected through separate lenses onto the screen 6, where they combine to form a color image. The video camera 14 may be either a color or a monochrome CCD camera.

The frequency counter 12 comprises a timer running at a fixed and known rate, and a counter for counting VP-VD pulses. The synchronizing signal generator 16 comprises a timer that can be programmed by the CPU 18 to generate CCD-VD pulses at designated timings. The compensation signal X is an analog signal. The compensation signal generator 22 comprises a digital-to-analog converter, and other circuitry necessary for converting data supplied by the CPU 18 to generate the compensation signal X. The multiplier 24 is an analog multiplier. The CPU 18 is, for example, a microprocessor, or the central processing unit of a microcontroller that may also include other elements in FIG. 1, such as the frequency counter 12 and synchronizing signal generator 16.

If the video camera 14 is a color camera, the video signal Y comprises three separate signals for the three primary colors red, blue, and green. The compensation signal generator 22 then produces separate compensation signals for these three colors, and the multiplier 24 has three analog multipliers that operate in parallel, one for each color.

Next the operation of the first embodiment will be described. First the calculation of compensation functions responsive to the different vertical scanning frequencies of the video projector 4 and video camera 14 will be described, with reference to FIGS. 2 to 9.

Figure 2:
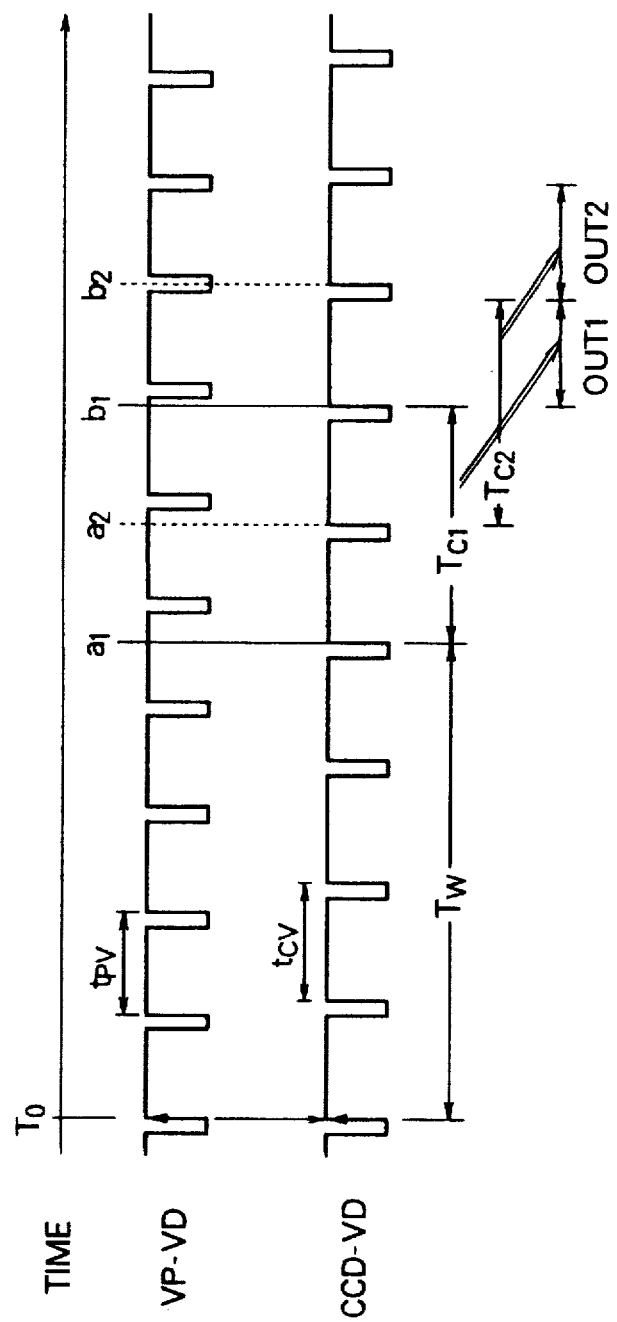
FIG. 2 is a timing diagram illustrating the operation of the first embodiment.

FIG. 2 illustrates the timing of the two vertical synchronizing signals VP-VD and CCD-VD.

The video projector 4 employs interlaced scanning, so one frame consists of two interlaced fields, and the first vertical scanning frequency $f_{VSIG}$ is the field frequency. Actual video projectors support a variety of vertical scanning frequencies, including frequencies higher than the standard television frequencies of approximately fifty or sixty fields per second (50 or 60 Hz). These higher vertical scanning frequency are employed to reduce flicker. The first vertical synchronizing signal VP-VD shown as an example in FIG. 2 has a frequency $f_{VSIG}$ of about 70 Hz, and comprises pulses with a period $t_{PV}$ equal to the reciprocal of $f_{VSIG}$.

The video camera 14 also employs interlaced scanning, so the frequency $f_{VCCD}$ of the second vertical synchronizing signal CCD-VD is also a field frequency. The signal CCD-VD shown as an example in FIG. 2 will be assumed to have the standard NTSC frequency of 59.94 Hz. The period $t_{CV}$ of CCD-VD is equal to the reciprocal of 59.94 Hz, or 16.683 ms. The CCD in the video camera 14 is of the frame transfer type. The output rate for each pixel in the CCD is $f_{VCCD}/2$ or 29.97 Hz.

It is not necessary for the raster-scanned display and video camera 14 to have the same number of horizontal scanning lines per field. Each field of the video signal Y produced by the video camera 14 will in general contain images of scanning lines in both fields of the raster-scanned display.

Nor is it necessary for $f_{VCCD}$ to be less than $f_{VSIG}$. With a frame-transfer CCD using interlaced scanning, it is only necessary for $f_{VSIG}$ to be equal to or greater than $f_{VCCD}/2$.

The invention is not limited to interlaced scanning, or to a video camera 14 operating at the NTSC rate. Any available video camera may be used.

On command from the CPU 18, the synchronizing signal generator 16 resets the second vertical synchronizing signal CCD-VD so that, at a time $T_0$, CCD-VD is synchronized with the first vertical synchronizing signal VP-VD. The horizontal synchronizing signal (not shown) generated by the synchronizing signal generator 16 is reset at the same time $T_0$. The video camera 14 uses an internal phase-locked loop (PLL, not visible in the drawings) to generate CCD timing signals from the synchronizing signals supplied by the synchronizing signal generator 16. To allow the PLL to stabilize after the reset at time $T_0$, a waiting time $T_W$ is provided, and imaging of the display on the screen 6 does not begin until time $T_W$ has elapsed from $T_0$.

Accumulation of photocharge in the first field of pixels in the CCD starts at time $a_1$ and continues for an interval $T_{C1}$ until time $b_1$. At time $b_1$ the photocharges in the first field are transferred to a first output register in the CCD, from which they are read out during interval OUT1 as the video signal Y. Photocharge accumulation in the second field of pixels in the CCD starts at time $a_2$ and continues for the interval $T_{C2}$ until time $b_2$. At time $b_2$ the photocharges in the second field are transferred to a second output register, becoming the video signal Y output during interval OUT2.

Because $f_{VCCD}$ is less than $f_{VSIG}$ in FIG. 2, the interval $T_{C1}$ from time $a_1$ to time $b_1$ is longer than two VP-VD periods, and the video projector 4 makes more than two complete vertical scans in this interval. During interval $T_{C1}$, the video projector 4 scans some areas of the raster-scanned display twice and other areas three times. In the output video signal Y, the areas scanned three times appear brighter than the parts scanned only twice.

Figure 3:
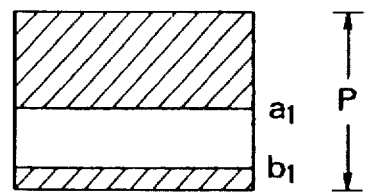
FIG. 3 illustrates the brightness distribution in a first field of an image of a raster-scanned display.

FIG. 3 is a diagram of the raster-scanned display showing the resulting brightness distribution, using hatching to indicate the areas that are scanned only twice. The symbols $a_1$ and $b_1$ identify the horizontal scanning lines that are scanned at times $a_1$ and $b_1$. The part of the raster-scanned display between the symbols $a_1$ to $b_1$ in FIG. 3 is scanned three times, while the part above $a_1$ and the part below $b_1$ are scanned only twice. The symbol P in FIG. 3 represents the vertical height of the raster-scanned display, measured in any convenient units.

Figure 4:
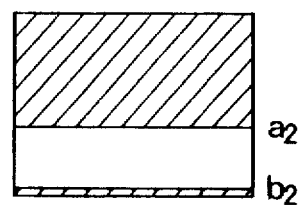
FIG. 4 illustrates the brightness distribution in a second field of the image of a raster-scanned display.
Figure 5:
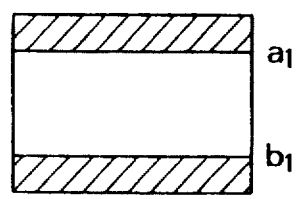
FIGS. 5, 6, 7, and 8 illustrate different brightness distributions occurring in images of raster-scanned displays.
Figure 6:
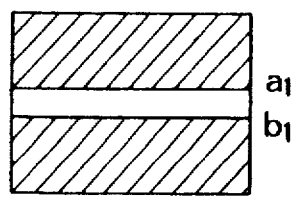
Figure 7:
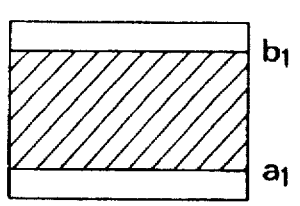
Figure 8:
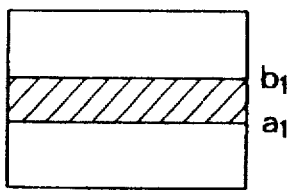

For the second field, the situation is similar. During the interval $T_{C2}$ from time $a_2$ to time $b_2$ in FIG. 2, the video projector 4 scans some areas twice and other areas three times, as shown in FIG. 4. The part of the raster-scanned display from $a_2$ to $b_2$ in FIG. 4 is scanned three times, while the part above $a_2$ and the part below $b_2$ are scanned only twice.

The second vertical scanning frequency $f_{VCCD}$ is fixed, so $t_{CV}$ is a known quantity. After the frequency counter 12 has measured $f_{VSIG}$, $t_{PV}$ is also a known quantity. From these two known quantities, the CPU 18 calculates the positions of $a_1$, $a_2$, $b_1$, and $b_2$ in FIGS. 3 and 4 as explained below.

In the following explanation, the percent sign (%) will be used to denote the mathematical remainder operation. Thus, $$D = A \% B$$

means that D is the remainder or fraction part when A is divided by B. In other words, for some integer C, $$A = (B \times C) + D$$

In FIG. 2, times $a_1$ and $b_1$ are located at intervals of four $t_{CV}$ and six $t_{CV}$, respectively, from the reset point $T_0$. The positions of $a_1$ and $b_1$ in FIG. 3 can therefore be calculated as follows:

$$a_1 = P \times \{(4 \times t_{CV}) \% t_{PV}\}/t_{PV}$$

$$b_1 = P \times \{(6 \times t_{CV}) \% t_{PV}\}/t_{PV}$$

Similarly, $a_2$ and $b_2$ are located at intervals of five $t_{CV}$ and seven $t_{CV}$, respectively, from the reset point $T_0$, so the positions $a_2$ and $b_2$ in FIG. 4 can be calculated as follows:

$$a_2 = P \times \{(5 \times t_{CV}) \% t_{PV}\}/t_{PV}$$

$$b_2 = P \times \{(7 \times t_{CV}) \% t_{PV}\}/t_{PV}$$

In general, in the i-th field of the video signal following the reset at $T_0$, brightness changes will appear at points $a_i$ and $b_i$ calculated as follows:

$$a_i = P \times \{[(i+3) \times t_{CV}] \% t_{PV}\}/t_{PV}$$

$$b_i = P \times \{[(i+5) \times t_{CV}] \% t_{PV}\}/t_{PV}$$

Using these formulas, the CPU 18 can calculate, for any field of the video signal, a brightness distribution that divides the field into two parts: a first part having one brightness value and a second part having another brightness value. FIGS. 5 to 8 show examples of these brightness distributions for various cases, with hatching again indicating the darker of the two parts. Depending on the specific values of $t_{CV}$, $t_{PV}$, and i in the equations above, the brighter part may be disposed between darker bands as in FIGS. 5 and 6, or the darker part may be disposed between brighter bands, as in FIGS. 7 and 8. The brighter part may be larger than the darker part as in FIGS. 5 and 8, or smaller as in FIGS. 6 and 7.

The brightness ratio between the two parts is (n+1)/n, where n is the number of times the darker part has been scanned and (n+1) is the number of times the brighter part has been scanned. For the CCD in this embodiment, which employs frame transfer and interlaced scanning, the CPU 18 calculates n as the quotient when ($2 \times t_{CV}$) is divided by $t_{PV}$, ignoring the remainder. That is, n is the greatest integer not exceeding ($2 \times t_{CV}$)/$t_{PV}$.

In FIG. 2, n is two and (n+1) is three, but in general n may be equal to one (if $t_{CV} < t_{PV}$), or may be greater than two (if $t_{CV} \geq 1.5 \times t_{PV}$).

Figure 9:
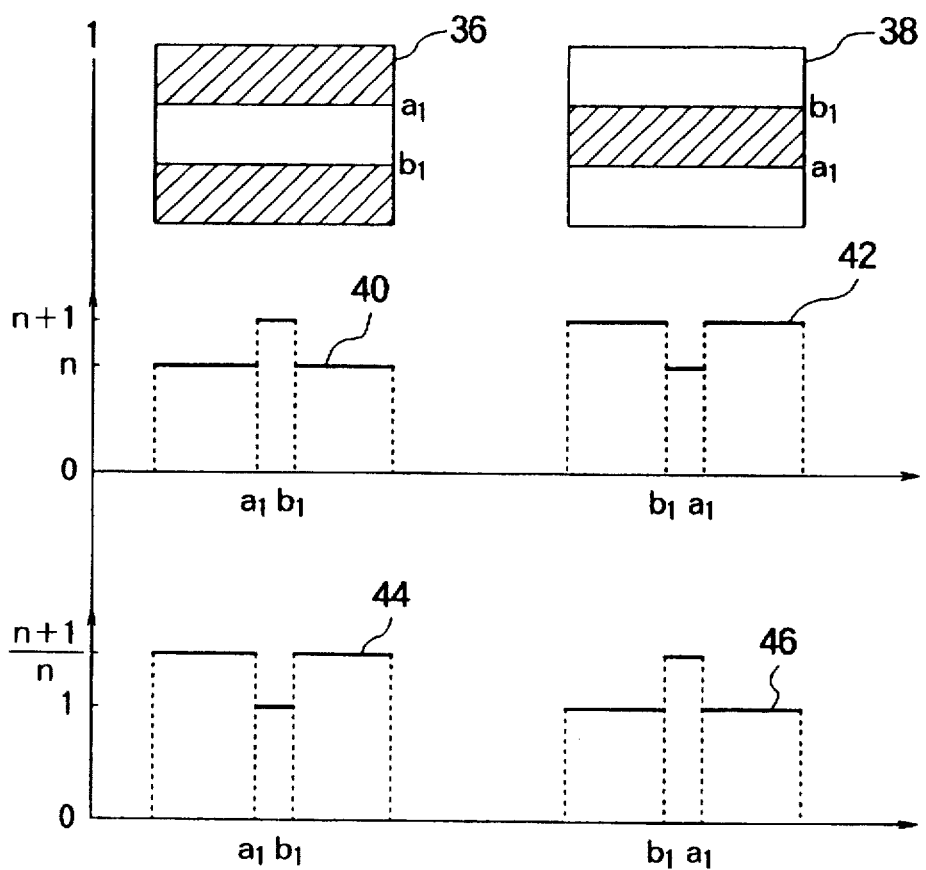
FIG. 9 illustrates the generation of compensation functions for two brightness distributions.

Having calculated $a_1$, $b_1$, and n by the formulas given above, the CPU 18 can construct a two-valued compensation function for the first field as illustrated in FIG. 9. The vertical axis in FIG. 9 represents numerical values, while the horizontal axis represents vertical position on the raster-scanned display. Two brightness distributions 36 and 38 are shown at the top of FIG. 9, the number of scans made by the video projector 4 is indicated by step functions 40 and 42 below these distributions, and the required two-valued compensation functions 44 and 46 are shown at the bottom of FIG. 9. These compensation functions are calculated as follows First, the CPU 18 compares $a_1$ and $b_1$. If $a_1$ and $b_1$ are equal, then all parts of the raster-scanned display have been scanned the same number of times, no compensation is necessary, and a value of unity is assigned to the compensation function at all points (the compensation functions is two-valued, but both values are unity).

If $a_1 < b_1$, as illustrated by distribution 36, the CPU 18 assigns a compensation value of (n+1)/n to the part of the raster-scanned display from the top scanning line down to the line scanned at time $a_1$, a compensation value of unity to the part between the lines scanned at time $a_1$ and $b_1$, and a compensation value of (n+1)/n to the part from the line scanned at time $b_1$ down to the bottom scanning line, producing compensation function 44.

If $a_1 > b_1$, as illustrated by distribution 38, the CPU 18 assigns a compensation value of unity to the part of the raster-scanned display from the top scanning line down to line $b_1$, a compensation value of (n+1)/n to the part between lines $b_1$ and $a_1$, and a compensation value of unity to the part from line $a_1$ down to the bottom scanning line, producing compensation function 46.

For the second field, the CPU 18 proceeds in the same way, comparing $a_2$ and $b_2$ and assigning compensation values of (n+1)/n and unity to appropriate parts of the raster-scanned display. The same can be done for the i-th field, where i=3, 4, . . . . The same pair of compensation values, unity and (n+1)/n, is used in every field, but the values of $a_i$ and $b_i$ differ from field to field, so a separate compensation function is required for each field.

Next the procedure for adjusting the video projector 4 will be described.

To begin the procedure, first the frequency counter 12 measures $f_{VSIG}$. This can be done in various ways, one of which is to count a certain number of VP-VD pulse cycles and measure the total length of these cycles. The CPU 18 divides the total cycle length by the number of cycles to obtain $t_{PV}$.

Next, the CPU 18 calculates the data (n+1)/n, $a_1$, $b_1$, $a_2$, and $b_2$ defining two-valued compensation functions for two fields, and uses these compensation functions to obtain further data for compensating for the brightness gradient that exists between the center and periphery of the screen 6. This gradient arises mainly from the projection angle. Specifically, the brightness varies as the fourth power of the cosine of the projection angle. Comparatively minor contributions to the brightness gradient are also made by the different positions of the red, green, and blue CRTs inside the video projector 4. The procedure for obtaining the compensation data differs depending on whether the video camera 14 is a color or monochrome camera.

If the video camera 14 is monochrome, after $f_{VSIG}$ has been measured, the CPU 18 commands the video projector 4, via the interface circuit 10, to display a pure white test pattern. This test pattern has a uniform brightness on each of the CRTs in the video projector 4, but when projected on the screen, the edges of the pattern appear darker than the center.

Next, the CPU 18 commands the synchronizing signal generator 16 to reset, waits for the time $T_W + T_{C1}$ as shown in FIG. 2, then commands the read-write memory 28 to store the two fields of video data output by the analog-to-digital converter 26 during intervals OUT1 and OUT2. Meanwhile, at suitable times the CPU 18 supplies the values of (n+1)/n, $a_1$, $b_1$, $a_2$, and $b_2$ to the compensation signal generator 22. From these data, and from the synchronizing signals received from the synchronizing signal generator 16, the compensation signal generator 22 generates an analog compensation signal X of the type shown at the bottom of FIG. 9. The multiplier 24 multiplies the video signal Y output by the video camera 14 by the analog compensation signal X to obtain a compensated video signal. The data stored in the read-write memory 28 have accordingly already been compensated for brightness differences due to the difference between the two vertical scanning frequencies $f_{VSIG}$ and $f_{VCCD}$.

After one frame (two fields) of data has been stored in the read-write memory 28, the CPU 18 processes the data to find the maximum brightness, and calculates correction factors that will align other brightness values with the maximum value. A separate correction factor is calculated for each pixel, e.g. by dividing the maximum brightness by the brightness of each pixel. These correction factors are stored in the read-write memory 28. If necessary, the products of these correction factors multiplied by (n+1)/n can also be stored in the read-write memory 28.

If the video camera 14 is a color camera, the CPU 18 commands the video projector 4 to display a pure green test pattern, a pure red test pattern, and a pure blue test pattern at different times, stores one frame of the video data resulting from each test pattern in the read-write memory 28, and calculates separate correction factors as described above for each of the three colors.

Next, the CPU 18 commands the video projector 4 to display other test patterns. When each test pattern is displayed, the CPU 18 commands the synchronizing signal generator 16 to reset the second vertical synchronizing signal CCD-VD, commands the compensation signal generator 22 to begin generating a compensation signal X at time $T_W + T_{C1}$ from the reset, and commands the read-write memory 28 to begin storing the compensated video data Z at the same time. The values of the compensation signal X in the areas scanned (n+1) times are now the correction factors stored in the read-write memory 28, while the values of X in the areas scanned only n times are these correction factors multiplied by (n+1)/n. For a color video camera 14, the compensation signal generator 22 produces a separate compensation signal for each of the three colors red, blue, and green, while the compensation signal generator 22 obtains separate red, blue, and green video signals from the video camera 14, and multiplies each video signal by the corresponding compensation signal.

The CPU 18 stores the compensated video data obtained for each test pattern in the read-write memory 28, processes the stored data to derive adjustment information, and sends the adjustment information in the form of adjustment commands via the interface circuit 10 to the video projector 4. Adjustments such as focusing and color registration are thus performed. Details of the individual adjustments will be omitted to avoid obscuring the invention with unnecessary detail.

The video projector 4 can thus be adjusted on the basis of test patterns imaged at a uniform brightness level everywhere on the screen 6. The compensation that produces the uniform brightness is moreover carried out in real time by the multiplier 24. Adjustments can be made both quickly and accurately.

As a variation of the first embodiment, instead of commanding the synchronizing signal generator 16 to reset before every test pattern is imaged, the CPU 18 can count CCD-VD pulses, compute the values of $a_i$ and $b_i$ as described above before the i-th CCD-VD pulse, and supply $a_i$ and $b_i$ to the compensation signal generator 22 so that the compensation signal generator 22 can produce compensation signals for all fields of the video signal Y.

As another variation of the first embodiment, the CPU 18 or compensation signal generator 22 can be adapted to calculate the correction values that compensate for the central-peripheral brightness gradient from theory, as explained below, instead of deriving these correction values from image data.

Figure 10:
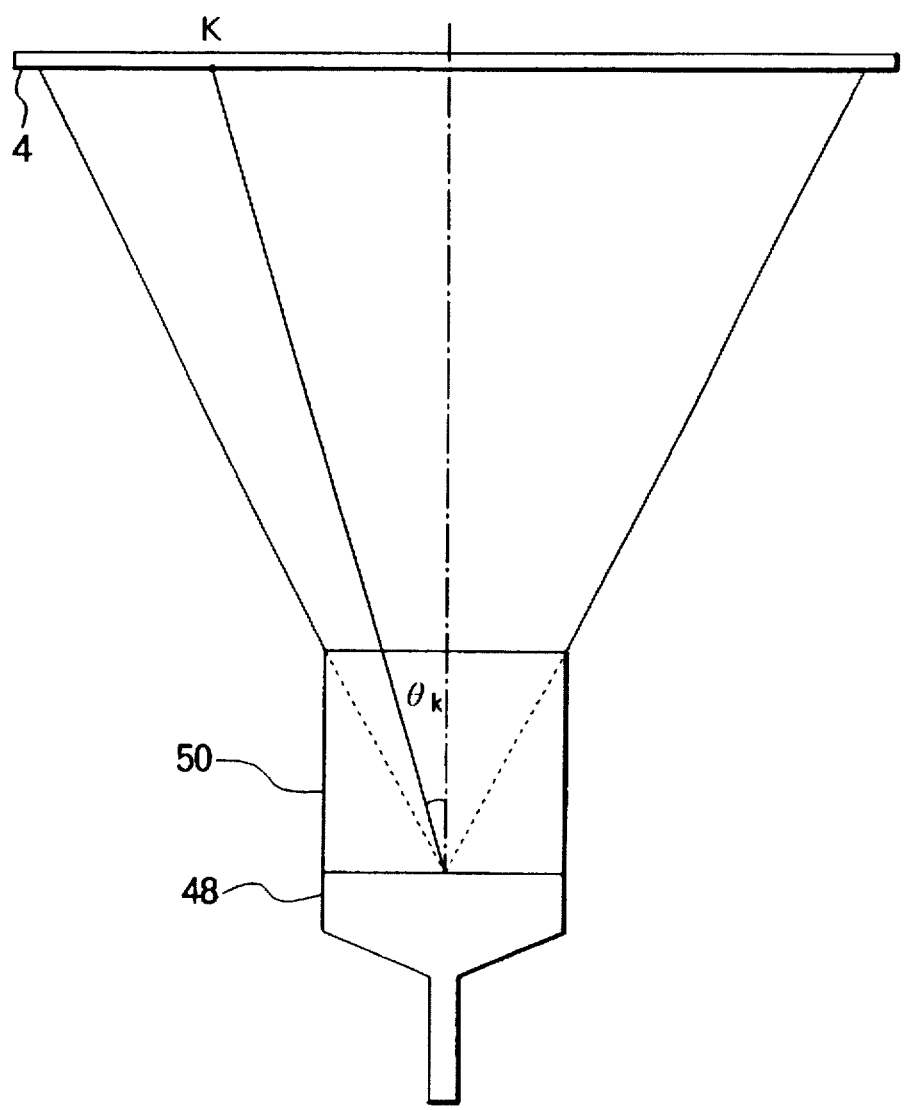
FIG. 10 illustrates the calculation of angle-dependent correction factors for a projected display.

The video projector 4 has a separate CRT and projection lens for each of the three colors red, blue, and green. FIG. 10 shows one CRT 48 and its projection lens 50. As noted above, the primary cause of the brightness gradient is the projection angle of the image on the screen. The projection angle of a ray incident at a point K on the screen 6 is denoted $\theta_k$ in FIG. 10. If B is the brightness at this point and $B_0$ is the brightness at the center of the screen, then to a close approximation, $$B=B_0\cos^4\theta_k$$

If the projection angle at the middle of the right and left edges of the screen is forty-five degrees, for example, the brightness there will be one-fourth of the brightness at the center of the screen.

Since there is a one-to-one correspondence between points on the screen 6 and points on the image surface of the CRT 48, the angle $\theta_k$ can be calculated from the position on the CRT 48. An example of the calculations follows.

Figure 11:
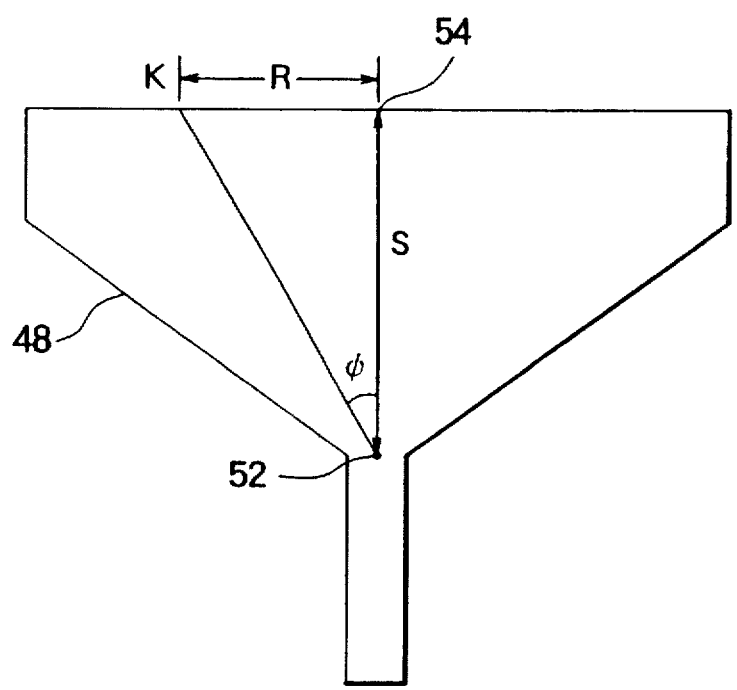
FIG. 11 further illustrates the calculation of these correction factors.

Let X and Y now represent deflections of the electron beam in the CRT 48 in the horizontal and vertical directions. Referring to FIG. 11, the deflection R of the beam spot from the center axis of the CRT 48 can be given by the following formula:

$$R=(X^2+Y^2)^{1/2}$$

Inside the CRT 48, the electron beam is deflected from a deflection center 52. When there is no deflection, the beam travels a distance S to a landing point 54 at the center of the CRT screen. When deflected by an angle $\psi$, the electron beam lands at a point K located a distance R from the center landing point 54. The following relation holds among $\psi$, R, and S:

$$\psi=\tan^{-1}(R/S)$$

The projection lens 50 in FIG. 10 can be designed so that the angles $\theta_k$ and $\psi$ are equal. The following relation then holds:

$$\theta_k=\tan^{-1}(R/S)$$

The brightness H at point K is therefore given by the following equation:

$$H=\cos^4[\tan^{-1}(R/S)]$$

The correction factor J is the reciprocal of H.

$$J=1/H$$
$$=1/\cos^4\{\tan^{-1}[(X^2+Y^2)^{1/2}/S]\}$$

The horizontal and vertical deflections X and Y can be calculated as follows. First, the frequency counter 12 receives, in addition to VP-VD, the video projector's horizontal scanning signal VP-HD, and measures the horizontal scanning frequency $f_{HSIG}$ of the video projector 4. The CPU 18 takes the reciprocal of $f_{HSIG}$ to obtain the horizontal period $t_{PH}$. The values of $t_{PV}$ and $t_{PH}$ are related as follows, where A is the number of horizontal scanning lines per vertical scan:

$$t_{PV}=A\times t_{PH}$$

After this measurement, the frequency counter 12 counts VP-HD pulses, the count being reset at every VP-VD pulse. If $K_Y$ is the maximum vertical deflection amplitude and $A_C$ is the count obtained by the frequency counter 12 at a particular time, the vertical deflection Y at this time is given by the following equation:

$$Y=(K_Y\times A_C/A)-(K_Y/2)$$

To determine the horizontal deflection X, the frequency counter 12 generates and counts pulses having a frequency B times higher than the horizontal scanning frequency $f_{HSIG}$ and a period thus equal to $t_{PH}/B$. The count is reset at each VP-HD pulse. If $K_X$ is the maximum horizontal deflection and $B_C$ is the count at a particular time, the horizontal deflection at this time is given by the following equation:

$$X=(K_X\times B_C/B)-(K_X/2)$$

Given the values of $K_X$, $K_Y$, and S, the equations above make it possible to calculate a brightness correction factor for each pixel, responsive to a count obtained from the frequency counter 12. The calculated correction factors are multiplied by (n+1)/n in areas that are scanned only n times, to compensate for the further brightness difference due to differing vertical scanning frequencies. These calculations can be performed directly by the compensation signal generator 22, or they can be performed by the CPU 18 and the results sent to the compensation signal generator 22. In either case, the correction factors are calculated in real time.

The CPU 18 or compensation signal generator 22 can also be adapted to count VP-HD pulses, instead of having this done by the frequency counter 12.

Calculation of the correction factors in this way may be less accurate that obtaining the correction factors through actual measurement of test patterns, but calculating the correction factors can save time, as there is no need to display pure read, blue, and green or white test patterns or process the resulting data. Calculation the correction factors also conserves memory space, as there is no need to store the correction factors in the read-write memory 28.

The CPU 18 can also compute a correction factor for each pixel ahead of time from the given values of $K_X$, $K_Y$, and S, or from other given values such as the dimensions of the raster-scanned display on the screen 6 and its distance from the projection lenses of the video projector 4. The calculated correction factors are stored in the read-write memory 28 and used in the same way as if they had been obtained by measurement of pure white or pure color test patterns. This eliminates both the need to obtain and process data from such test patterns, and the need to calculate correction factors in real time.

More efficiently, if the correction factors for a particular type of video projector 4 are always the same, the correction factors can be stored ahead of time in the read-only memory 20, eliminating the need for any calculation at all.

Second Embodiment

Figure 12:
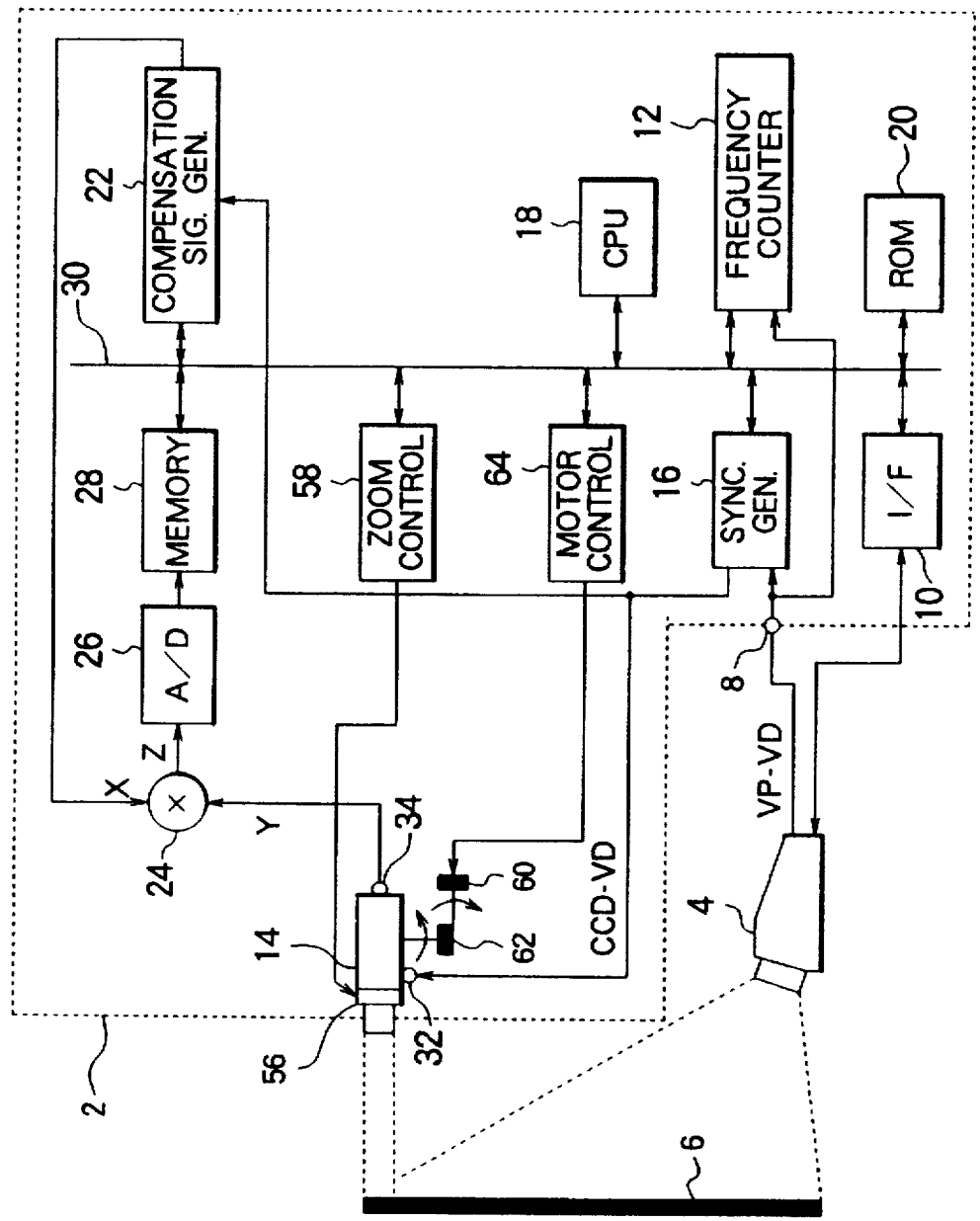
FIG. 12 is a block diagram illustrating a second embodiment of the invention.

FIG. 12 illustrates the second embodiment, using the same reference numerals for elements that are equivalent to elements in FIG. 1. Descriptions of these elements will be omitted.

The video camera 14 in the second embodiment has a lens with a zoom mechanism 56, which is controlled by a zoom controller 58, and a pair of motors 60 and 62, which are controlled by a motor controller 64. The zoom mechanism 56 enables the video camera 14 to zoom in on and magnify one part of the screen 6. The motors 60 and 62 constitute a pointing mechanism that rotates the video camera 14 about two axes, thereby aiming the video camera 14 so that it points at a selectable part of the screen 6. The CPU 18 commands the zoom controller 58 and motor controller 64 via the bus 30.

At the beginning of the adjustment procedure the vertical scanning frequency of the video projector 4 is measured and correction factors for the central-peripheral brightness gradient are obtained as in the first embodiment. In the following description, it will be assumed that the correction factors are stored in the read-write memory 28.

Next the imaging of test patterns begins. When a test pattern covering the entire screen 6 is to be imaged in its entirety, the CPU 18 commands the motor controller 64 to aim the video camera 14 at the center of the screen 6, and the zoom controller 58 to adjust the zoom mechanism 56 so that the field of view of the video camera 14 matches the extent of the raster-scanned display on the screen 6. The test pattern is then imaged and processed as in the first embodiment.

To examine part of a test pattern in more detail, the CPU 18 first commands the video projector 4, via the interface circuit 10, to display a pattern defining the target area to be examined. This pattern is, for example, a bright rectangle on a dark background. The pattern is imaged and stored in the read-write memory 28, and processed by the CPU 18 to determine the horizontal and vertical limits of the target area. Since the purpose is only to locate the target area on the screen 6, no compensation need be applied; the compensation signal output by the compensation signal generator 22 may have a constant unity value.

Next the CPU 18 commands the motor controller 64 to point the video camera 14 at the center of the target area, and the zoom controller 58 to adjust the zoom mechanism 56 to magnify the target area. The CPU 18 also calculates coordinate-transformation coefficients for mapping the correction factors and other compensation data onto the field of view of the video camera 14.

The area now viewed by the video camera 14 is imaged in the same way that the entire screen 6 was imaged in the first embodiment, with brightness compensation, but the compensation signal is modified as follows. The CPU 18 uses the calculated coordinate-transformation coefficients to determine which correction factors stored in the read-write memory 28 apply to which pixels in the field of view of the video camera 14. The compensation signal generator 22 reads only these correction factors from the read-write memory 28. When the i-th field is imaged, the CPU 18 calculates the values of $a_i$ and $b_i$ described in the first embodiment, and uses the coordinate-transformation coefficients to transform these values to corresponding values in the field of view of the video camera 14. Responding to the transformed values of $a_i$ and $b_i$, the compensation signal generator 22 multiplies the correction factors mapped onto the area that was scanned only n times by (n+1)/n.

In this way a magnified image of a test pattern can be obtained that is free of brightness differences due to different vertical scanning frequencies, or due to distance from the center of the screen. The necessary brightness compensation is carried out in real time by the multiplier 24, so accurate test-pattern data are obtained quickly.

Third Embodiment

Figure 13:
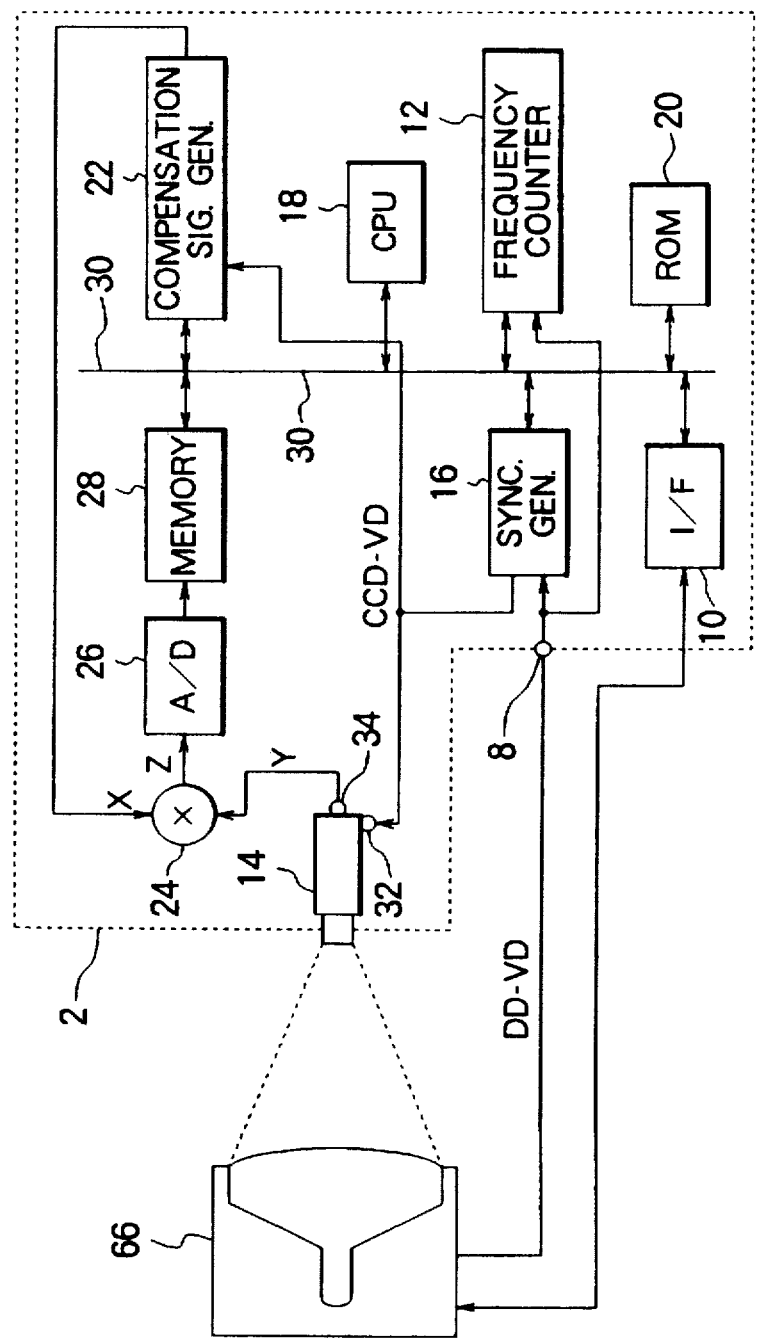
FIG. 13 is a block diagram illustrating a third embodiment.

Referring to FIG. 13, the imaging system 2 in the third embodiment is identical to the imaging system 2 in the first embodiment, corresponding elements being identified by the same reference numerals, but the device being tested and adjusted is now a direct-view display 66 such as the monitor display of a computer. The raster-scanned display is viewed directly on the phosphor screen of a CRT in the direct-view display 66, instead of being projected onto another screen.

Compensation for brightness differences due to vertical scanning frequencies is carried out as described in the first embodiment, the vertical synchronizing signal DD-VD from the direct-view display 66 being input at the timing input terminal 8. Compensation for the brightness gradient due to distance from the center of the screen is carried out by imaging pure white or pure color test patterns and processing the imaged data, also as described in the first embodiment.

The difference between the first and third embodiments lies in the nature of the central-peripheral brightness gradient. One of the primary causes is now the black matrix on the phosphor screen of the direct-view display 66. The black matrix has vertical guard bands that separate each phosphor dot or stripe from the horizontally adjacent phosphor dots or stripes. The width of these guard bands increases towards the edges of the screen, to allow for decreasing electron-beam quality. Brightness thus decreases with horizontal distance from the center of the screen, but is independent of vertical position. The brightness at the right and left edges of the screen is typically fifty to sixty percent of the brightness at the center.

The correction factors necessary to compensate for this brightness gradient differ depending on the black matrix geometry, and are best obtained by imaging a pure-white test pattern, or pure-color test patterns, rather than being calculated from theory. After the correction factors have been obtained, other test patterns can be imaged to inspect, test, or adjust the direct-view display 66.

For a particular model of direct-view display 66, the brightness gradient will always be the same, so it is also possible to measure the brightness gradient once and store the necessary correction factors in the ROM 20 in the imaging system 2, instead of measuring the gradient separately for each direct-view display 66.

Fourth Embodiment

Figure 14:
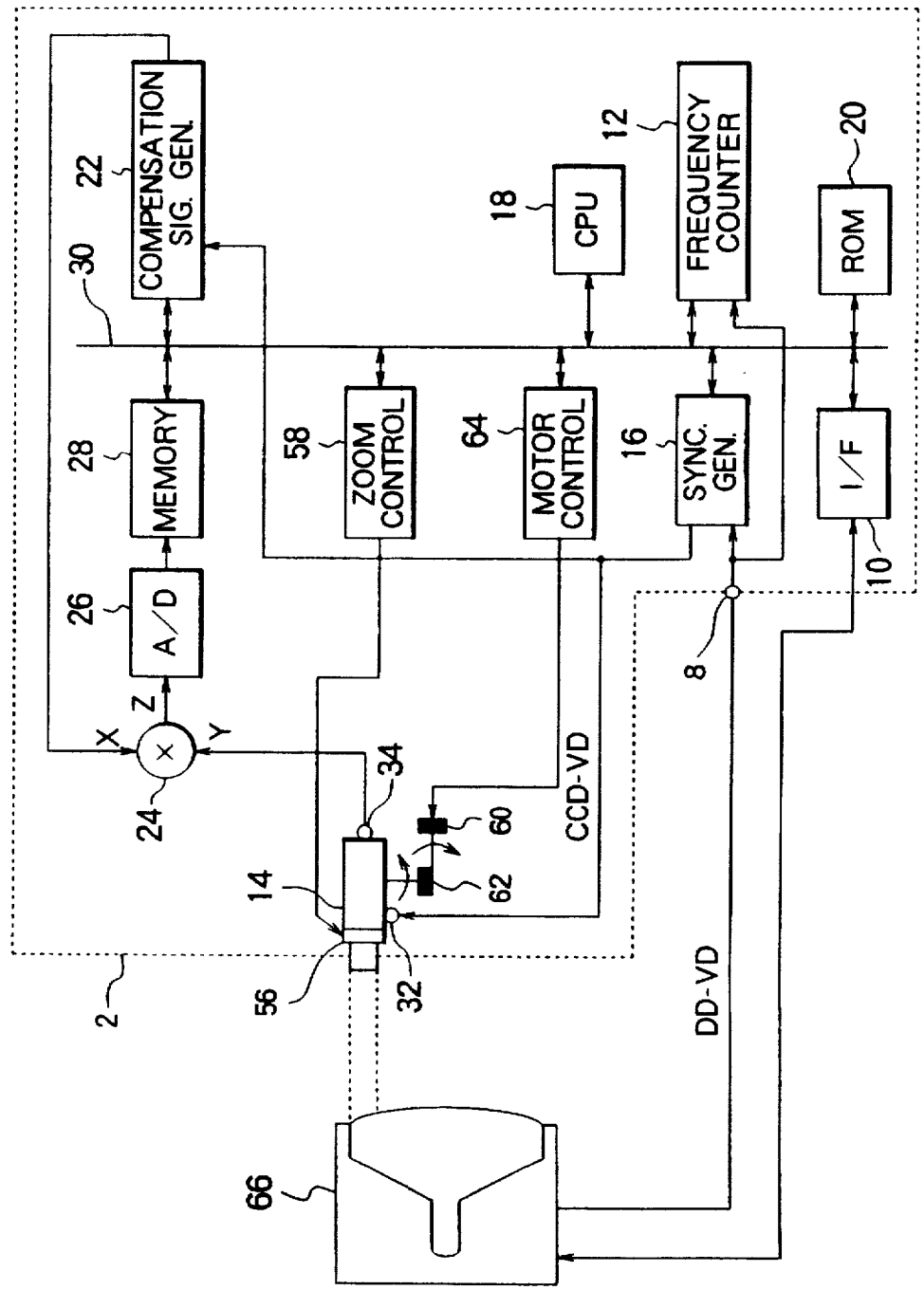
FIG. 14 is a block diagram illustrating a fourth embodiment.

Referring to FIG. 14, the imaging system 2 in the fourth embodiment is identical to the imaging system 2 in the second embodiment, but the device being tested or adjusted is a direct-view display 66 as in the third embodiment. FIG. 14 employs the same reference numerals as in FIGS. 12 and 13 to denote corresponding elements.

The operation of the fourth embodiment can be understood from the description of the second and third embodiments, so further description will be omitted.

Fifth Embodiment

Figure 15:
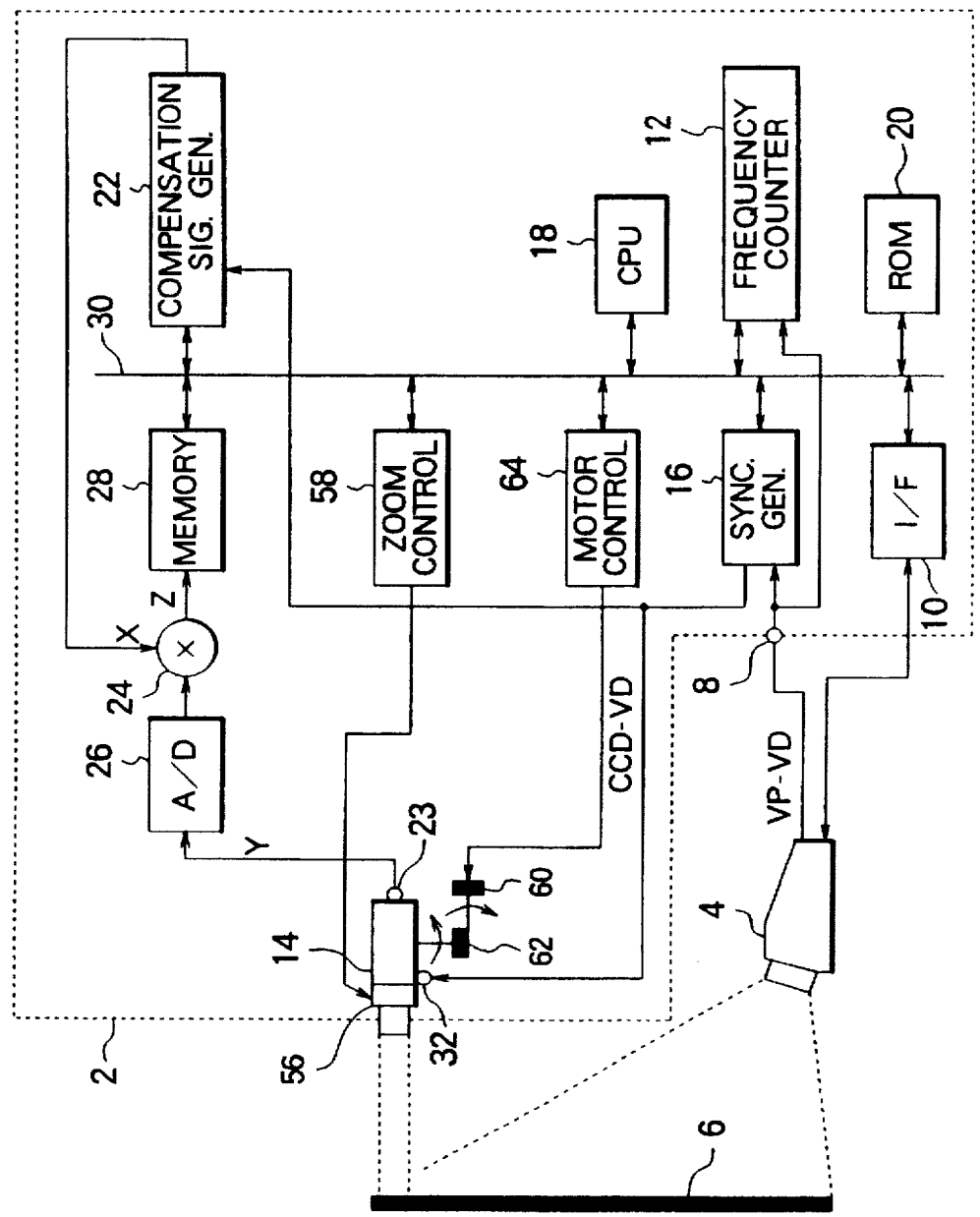
FIG. 15 is a block diagram illustrating a fifth embodiment.

FIG. 15 shows the imaging system 2 in the fifth embodiment, using the same reference numerals as in FIG. 12 for corresponding elements.

The difference between the second and fifth embodiments is that in the fifth embodiment, the video signal Y output by the video camera 14 is digitized by the analog-to-digital converter 26 before brightness compensation is applied by the multiplier 24. The compensation signal generator 22 accordingly outputs a digital instead of an analog compensation signal X, and the multiplier 24 is a digital multiplier.

Aside from this difference, the fifth embodiment operates in the same way as the second embodiment, so further description will be omitted. The same effects are obtained as in the second embodiment.

The first, third, and fourth embodiments can be similarly modified, by performing analog-to-digital conversion before brightness compensation.

Sixth Embodiment

Figure 16:
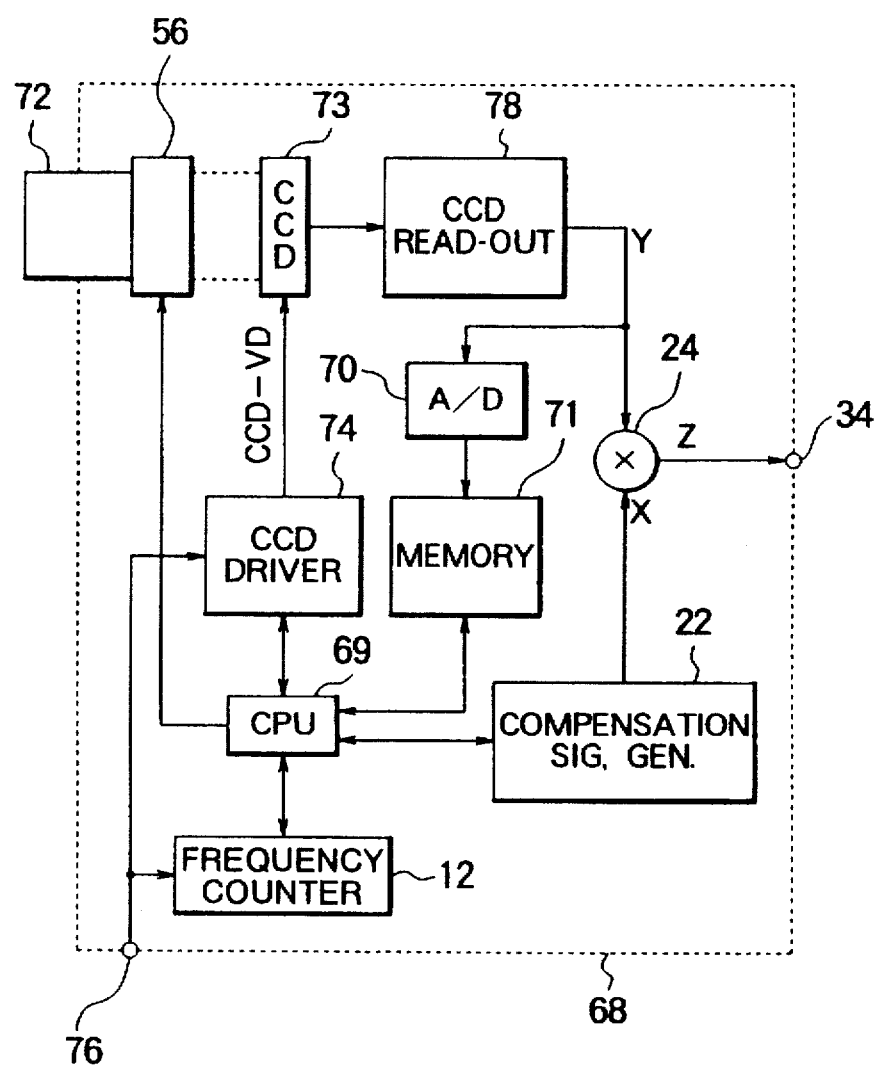
FIG. 16 is a block diagram illustrating a sixth embodiment.

The sixth embodiment is an imaging system, more specifically a CCD camera system, that is useful for imaging a scene in which a raster-scanned display appears. FIG. 16 shows the structure of this CCD camera system 68, using the same reference numerals as in the previous embodiments to identify the frequency counter 12, compensation signal generator 22, multiplier 24, video output terminal 34, and zoom mechanism 56.

The CPU 69, analog-to-digital converter 70 and read-rite memory 71 are similar to the corresponding elements in the preceding embodiments, but the CPU 69 is not programmed to send adjustment commands to a video projector. The analog-to-digital converter 70 is coupled to the input side of the multiplier 24, instead of to the output side. The video data stored in the read-write memory 71 are therefore values of the uncompensated video signal Y. The compensated video signal Z produced by the multiplier 24 is supplied to the video output terminal 34.

The ROM and communication bus have been omitted to simplify the drawing.

The optical image received by the CCD camera system 68 is focused by a lens 72 onto a CCD imaging element 73. The lens 72 is adjustable by the zoom mechanism 56, which in turn is controlled by the CPU 69.

In the preceding embodiments, a synchronizing signal generator generated synchronizing signals from which the video camera generated internal timing signals, but in the present embodiment, the CPU 69 directly controls a CCD driver circuit 74 that sends synchronizing and control signals to the CCD imaging element 73 and other parts of the CCD camera system 68. Among these signals are a vertical synchronizing signal CCD-VD, and a horizontal synchronizing signal. The CCD driver circuit 74 thus performs the functions of the synchronizing signal generator in the preceding embodiments. The CCD driver circuit 74 operates the CCD camera system 68 at a fixed vertical scanning frequency, which will be assumed in the following description to be the NTSC frequency of 59.94 Hz.

The invention is of course not restricted to the NTSC vertical synchronizing frequency.

The CCD driver circuit 74 also receives an external vertical synchronizing signal input at a synchronizing signal input terminal 76. On command from the CPU 69, the CCD driver circuit 74 resets the CCD-VD signal so that the next CCD-VD pulse is synchronized with the next vertical scanning pulse received from the synchronizing signal input terminal 76. Thereafter, the CCD driver circuit 74 generates CCD-VD pulses at the standard NTSC frequency, regardless of the frequency of the input at the synchronizing signal input terminal 76.

In response to the CCD-VD signal, the CCD imaging element 73 transfers photocharges into a pair of output registers (not visible), from which the photocharges are read by a CCD readout circuit 78 as an analog video signal Y. The analog video signal Y is output to the multiplier 24 and analog-to-digital converter 70.

Next the operation of the sixth embodiment will be described.

When the CCD camera system 68 is used to image a scene in which a raster-scanned display appears, the vertical synchronizing signal of the display system that produces the raster-scanned display is input at the synchronizing signal input terminal 76. The frequency counter 12 measures the frequency $f_{VSIG}$ of this vertical synchronizing signal. The CPU 69 obtains the $f_{VSIG}$ value from the frequency counter 12.

Next, the display system is given commands that clear the raster-scanned display to an all-white state, or to a pure red, blue, or green state. The CCD camera system 68 is pointed at the raster-scanned display and the zoom mechanism 56 is controlled so that the raster-scanned display matches the field of view of the CCD camera system 68. The CPU 69 commands the CCD driver circuit 74 to reset, waits for the CCD driver circuit 74 to stabilize, then sends write signals to the read-write memory 71, causing the read-write memory 71 to store an image of the raster-scanned display.

Next, the CPU 69 processes this image to calculate correction factors that compensate for the central-peripheral brightness gradient on the raster-scanned display. These calculations are carried out as in the first embodiment, except that the CPU 69 takes into consideration the brightness differences due to the difference (if any) between $f_{VSIG}$ and the NTSC vertical scanning frequency. The correction factors are stored in the read-write memory 71.

After these preparations, the CCD camera system 68 can be used to obtain further images of the entire raster-scanned display, or magnified images of part of the raster-scanned display, or images of a larger scene of which the raster-scanned display forms one part. These three cases will be described separately below.

When the raster-scanned display continues to match the field of view of the CCD camera system 68, the CPU 69 calculates compensation data as explained in the first embodiment, the compensation signal generator 22 generates corresponding compensation signals, and a continuous, compensated video signal Z is output at the video output terminal 34. During the output of this compensated video signal, the analog-to-digital converter 70 can be shut down to conserve power.

When a magnified image of part of the raster-scanned display is obtained, the CCD camera system 68 operates generally as described in the second embodiment. First the display system is commanded to display a bright rectangle defining the target area. An image of this display is stored in the read-write memory 71, enabling the CPU 69 to identify the target area and calculate coordinate-transformation coefficients. Then the CCD camera system 68 is pointed at the target area, the zoom mechanism 56 is controlled so as to zoom in on the target area, the CPU 69 reads the relevant correction factors from the read-write memory 71 and multiplies those correction factors that apply to areas scanned only n times by (n+1)/n, the compensation signal generator 22 generates a compensation signal from the resulting compensation data, and a magnified, compensated image of the target area of the raster-scanned display is obtained at the video output terminal 34.

When the raster-scanned display forms only part of the scene viewed by the CCD camera system 68, the display system is commanded to display a predetermined pattern, such as an all-white pattern, on the raster-scanned display, and an image of the scene is stored in the read-write memory 71. The CPU 69 processes this image, recognizes the predetermined pattern, and thereby determines the position of the raster-scanned display in the field of view. Knowing this position, the CPU 69 can calculate the necessary data for a compensation signal that compensates for the brightness distribution on the raster-scanned display, and has a value of unity in parts of the scene not occupied by the raster-scanned display. The brightness distribution includes both the brightness differences caused by the difference (if any) between $f_{VSIG}$ and the NTSC vertical scanning frequency, and the central-peripheral brightness gradient.

The CCD camera system 68 of the sixth embodiment can be used in testing, inspecting, or adjusting raster-scanned displays, and for a variety of other purposes, one of which will be described in the next embodiment.

As a variation of the sixth embodiment, the correction factors for the central-peripheral brightness gradient can be obtained by theoretical calculations, or can be pre-stored in a read-only memory, instead of being obtained from measurement of a pure-white or pure-color display. Under certain conditions, the analog-to-digital converter 70 and read-write memory 71 then become unnecessary, and can be removed from the configuration shown in FIG. 16. The necessary conditions are that other means, such as manual viewfinder means, are provided for notifying the CPU 69 of the relative positions of the raster-scanned display and the field of view of the CCD camera system 68.

As another variation, compensation for the central-peripheral brightness gradient can be omitted. The CCD camera system 68 can be adapted to compensate only for the difference between vertical scanning frequencies, eliminating the highly irritating flicker caused by this frequency difference, but leaving the central-peripheral brightness gradient uncompensated, as it would appear to the human eye.

As still another variation, the CCD readout circuit 76 can be adapted to produce a digital video signal, in which case the analog-to-digital converter 70 is unnecessary, the compensation signal generator 22 produces a digital compensation signal, the multiplier 24 is a digital multiplier, and the compensated video signal Z output at the video output terminal 34 is also digital. If an analog video signal is required, it can then be produced by an external digital-to-analog converter.

Seventh Embodiment

Figure 17:
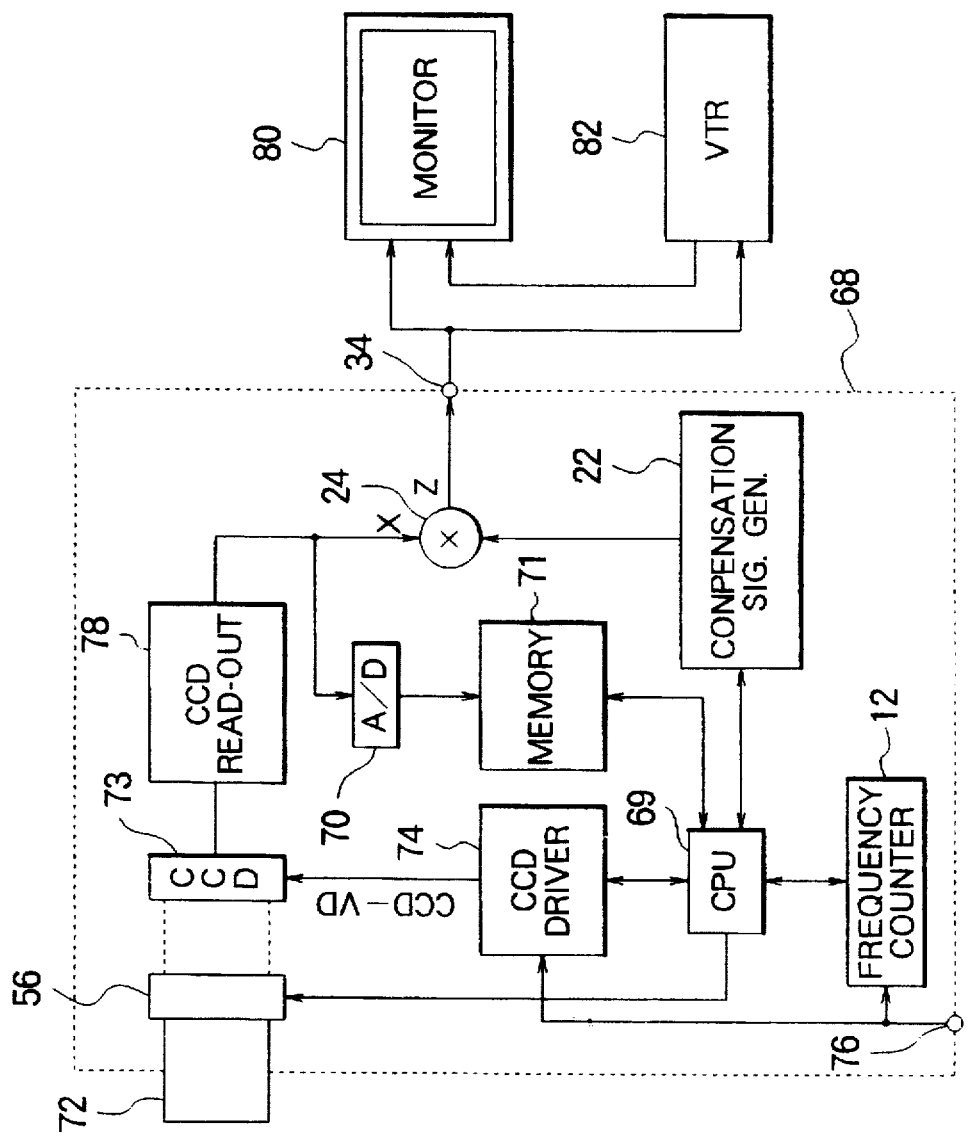
FIG. 17 is a block diagram illustrating a seventh embodiment.

The seventh embodiment, shown in FIG. 17, is a surveillance system employing the sixth embodiment as an imaging system. FIG. 17 uses the same reference numerals as in FIG. 16 for corresponding elements. The additional elements are a video monitor 80 and a video tape recorder 82, both of which receive the compensated video signal Z output by the CCD camera system 68.

The video monitor 80 in FIG. 17 is located in, for example, a control room or guard room, to provide supervisory or security personnel with a view of the scene imaged by the CCD camera system 68. The video tape recorder 82 records the signal output by the CCD camera system 68 on tape.

If the scene imaged by the CCD camera system 68 includes a raster-scanned display, such as a computer monitor screen, the vertical synchronizing signal of that display is input to the CCD camera system 68 at the synchronizing signal input terminal 76. The CCD camera system 68 compensates for the difference (if any) between its own vertical scanning frequency and that of the raster-scanned display as in the sixth embodiment. Compensation for the central-peripheral brightness gradient of the raster-scanned display can also be carried out as in the sixth embodiment, if necessary.

When the scene is viewed on the screen of the video monitor 80, it is free of the annoying flicker that would occur without compensation for the different vertical scanning frequencies. The image of the raster-scanned display appears stable, and if the CCD imaging element 73 has sufficient resolution, the detailed content of the display can be discerned. A record of the display content can be made by the video tape recorder 82.

The surveillance system may be adapted so that the video tape recorder 82 records the output of the CCD camera system 68, not continuously, but at certain intervals. In this case the timing signal that controls the recording intervals is preferably also supplied to the CCD camera system 68, and the CCD camera system 68 is adapted to reset its vertical scanning signal just before recording begins, so that the compensation signal will be accurately synchronized with the raster-scanned display.

The CCD camera system 68, video monitor 80, and video tape recorder 82 must all employ the same video format, but no restrictions are placed on this format. Available formats include NTSC, PAL (Phase Alternation Line), SECAM (Sequentiel Couleur avec Memoire), and HDTV (High-Definition Television).

Eighth Embodiment

Figure 18:
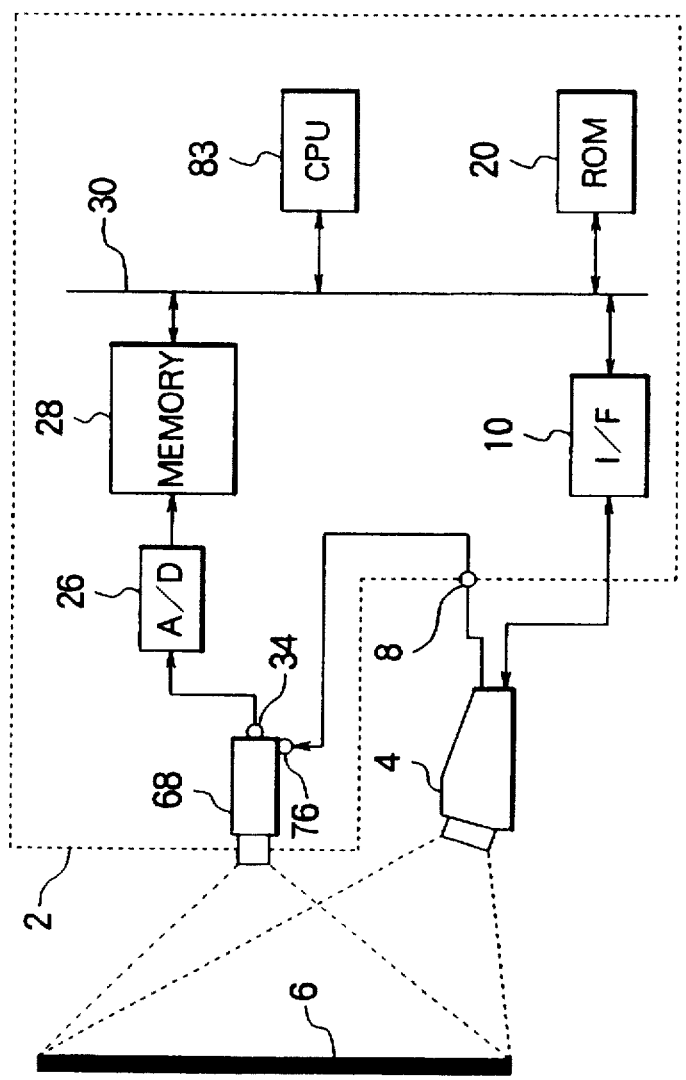
FIG. 18 is a block diagram illustrating an eighth embodiment.

Referring to FIG. 18, the eighth embodiment is an imaging system 2 that employs the CCD camera system 68 of the sixth embodiment to carry out set-up adjustments of a video projector 4. Other than the CCD camera system 68 and CPU 83, all elements in FIG. 80 are identical to the corresponding elements with the same reference numerals in FIG. 1. Since brightness compensation is performed inside the CCD camera system 68, no additional frequency counter, synchronizing signal generator, compensation signal generator, or multiplier is necessary, and the system configuration in FIG. 18 is considerably simplified. The CPU 83 in FIG. 18 processes the image data in the read-write memory 28 to obtain adjustment information and sends commands to the video projector 4 via the interface circuit 10, but the CPU 83 no longer has to compute compensation data.

Ninth Embodiment

As pointed out in the sixth embodiment, compensation for the central-peripheral brightness gradient can be omitted in surveillance systems and other systems in which the main object is to eliminate the highly objectionable flicker produced by different vertical scanning frequencies. Even in testing and adjustment systems, compensation for the central-peripheral brightness gradient can be omitted for certain types of tests and adjustments.

Furthermore, when the imaging system and raster-scanned display have the same vertical scanning frequency, compensation for the nonexistent frequency difference also becomes unnecessary. It is still desirable, however, for vertical scanning in the imaging system to be synchronized with the vertical scanning of the raster-scanned display, so that, for example, the transfer of photocharges to CCD output registers can take place during the vertical blanking interval of the raster-scanned display.

Figure 19:
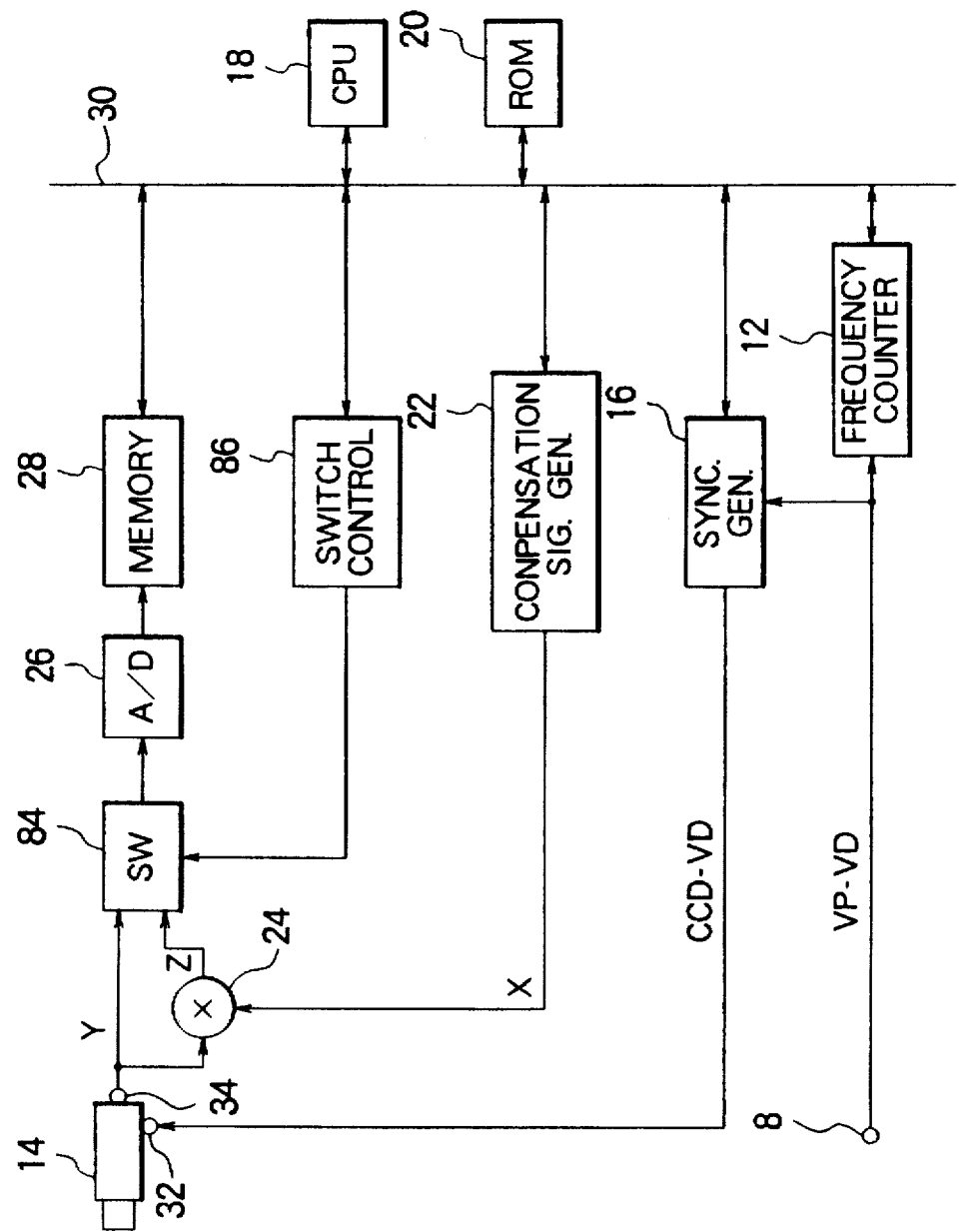
FIG. 19 is a block diagram illustrating a ninth embodiment.

The ninth embodiment of the invention is accordingly an imaging system that compensates only for the difference between vertical scanning frequencies, and bypasses this compensation when the imaging system and raster-scanned display have the same vertical scanning frequency. FIG. 19 shows the structure of this imaging system, using the same reference numerals as in FIG. 1 for corresponding elements. To simplify the drawing, the video projector 4 and interface circuit 10 have been omitted.

The new elements in FIG. 19 are a switch 84 and a switch controller 86. The switch 84 receives both the video signal Y output by the video camera 14 and the compensated video signal Z output by the multiplier 24, selects one of these two signals under control of the switch controller 86, and supplies the selected signal to the analog-to-digital converter 26.

Next the operation of the ninth embodiment will be described.

As in the first embodiment, the frequency counter 12 measures the frequency of the vertical synchronizing signal VP-VD received at the timing input terminal 8. If this frequency differs from the vertical scanning frequency of the video camera 14, the CPU 18 calculates a two-valued compensation function with values of (n+1)/n and unity, and the compensation signal generator 22 produces an analog compensation signal having these values in areas that are scanned n times and (n+1) times, respectively. In addition, the CPU 18 sends a command via the bus 30 to the switch controller 86, causing the switch controller 86 to set the switch 84 so that the compensated video signal Z is selected and supplied to the analog-to-digital converter 26. Imaging operations are then carried out as in the first embodiment, except that the compensation signal does not include correction factors for a central-peripheral brightness gradient.

If the vertical scanning frequency measured by the frequency counter 12 is the same as the vertical scanning frequency of the video camera 14 (for example, if both have the NTSC vertical scanning frequency of 59.94 Hz), the CPU 18 commands the switch controller 86 to set the switch 84 so that the uncompensated video signal Y output by the video camera 14 is selected and supplied to the analog-to-digital converter 26. Preferably, the CPU 18 also commands the compensation signal generator 22 and multiplier 24 to shut down, to conserve power. At appropriate times, such as at times before the imaging of a test pattern, the CPU 18 commands the synchronizing signal generator 16 to reset the vertical synchronizing signal CCD-VD supplied to the video camera 14, so that it is synchronized with the vertical synchronizing signal VP-VD received from the raster-scanned display.

When the raster-scanned display and video camera 14 have the same vertical scanning frequency, the ninth embodiment has the advantage of avoiding needless compensation calculations, and avoiding needless error that might be introduced by the analog multiplication process in the multiplier 24.

Tenth Embodiment

The tenth embodiment differs from the preceding embodiments in performing no brightness compensation. The brightness differences due to different vertical scanning frequencies are avoided by adjusting the timing of the vertical synchronizing signal of the video camera.

Figure 20:
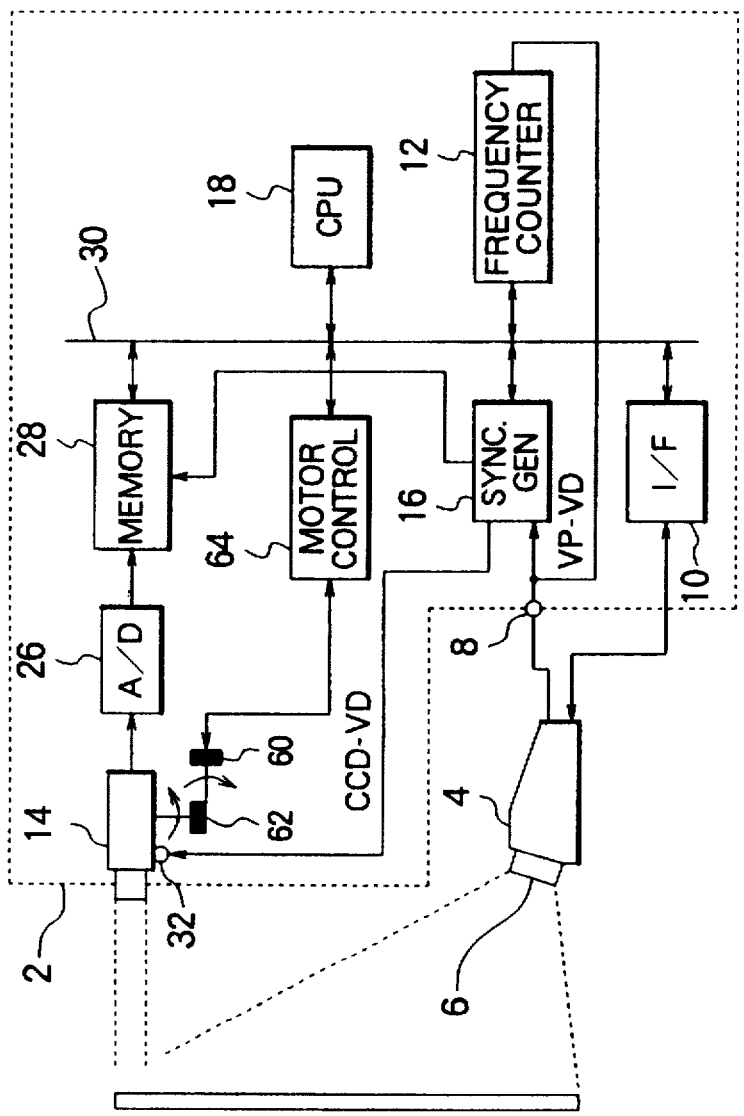
FIG. 20 is a block diagram illustrating a tenth embodiment.

FIG. 20 shows the structure of the tenth embodiment, using the same reference numerals as in FIG. 12 for corresponding elements. The video camera 14 in the tenth embodiment is movably mounted, as in the second embodiment. The video camera 14 does not necessarily have a zoom lens, but is adapted to obtain a magnified image of one selectable part of the screen 6. The tenth embodiment has no compensation signal generator or multiplier.

Next the operation of the tenth embodiment will be described.

To begin adjustment of the video projector 4, the frequency counter 12 measures the frequency $f_{VSIG}$ of the vertical synchronizing signal VP-VD from the video projector 4. The CPU 18 compares $f_{VSIG}$ with the known vertical scanning frequency $f_{VCCD}$ of the video camera 14. Subsequent processing differs, depending on whether $f_{VSIG}$ and $f_{VCCD}$ are equal or unequal.

If $f_{VSIG}$ and $f_{VCCD}$ are unequal, the CPU 18 calculates the value $t_{PV}$ as in the first embodiment, commands the video projector 4 to display a test pattern, and commands the motor controller 64 to point the video camera 14 at a part of the screen 6 where the test pattern appears. The test pattern need not be equal in size to the field of view of the video camera 14, as long as the test pattern, or part of the test pattern, appears in the field of view of the video camera 14. If necessary, the CPU 18 can command the video projector 4 to display a bright rectangle defining the part of the test pattern that is to be imaged, as described in the first embodiment. It will be assumed below that the CPU 18 knows the location of the part of the test pattern viewed by the video camera 14.

Figure 21:
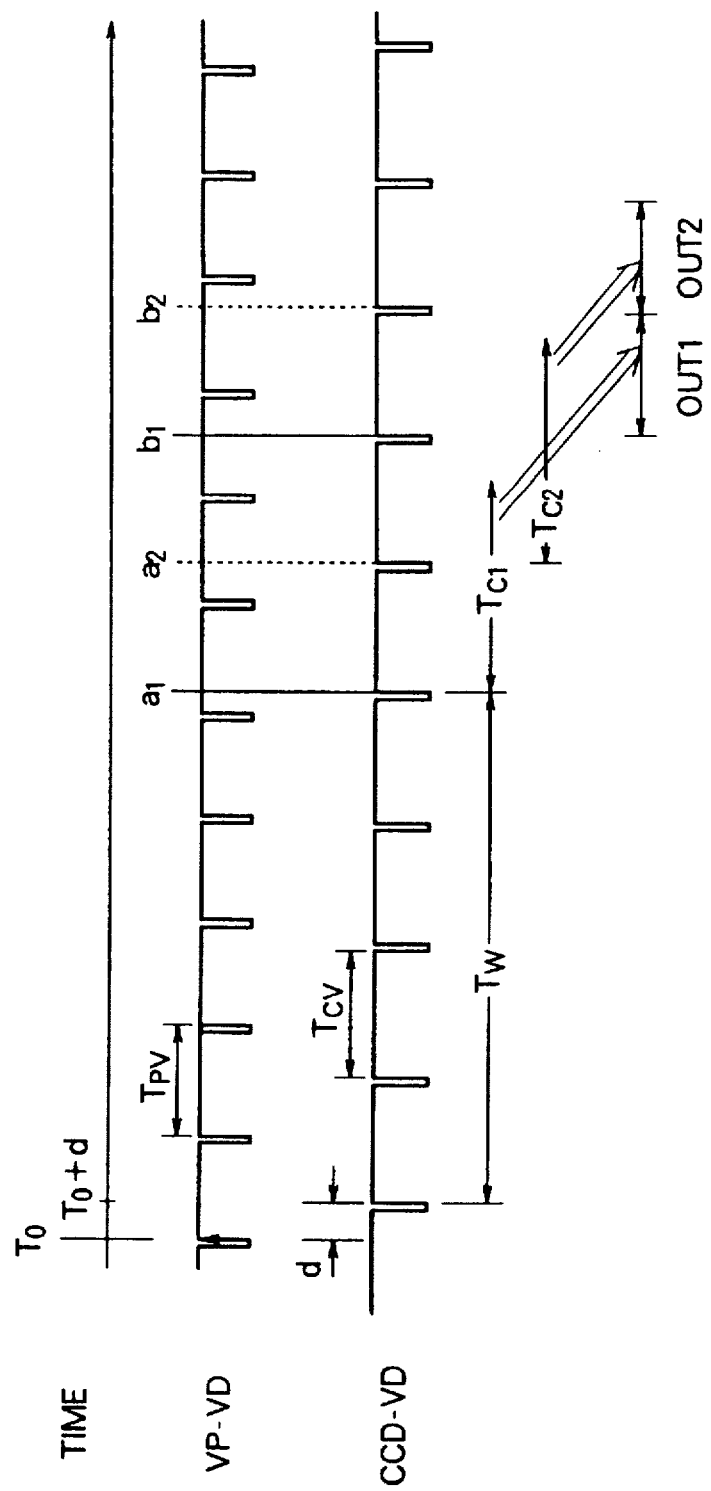
FIG. 21 is a timing diagram illustrating the operation of the tenth embodiment for unequal vertical scanning frequencies.

From the position of the field of view of the video camera 14, the CPU 18 next calculates a certain delay d, and commands the synchronizing signal generator 16 to reset the vertical synchronizing signal CCD-VD so that CCD-VD is delayed by the amount d with respect to the vertical synchronizing signal VP-VD at a designated time. Referring to FIG. 21, if the designated time is $T_0$, the synchronizing signal generator 16 resets CCD-VD so that a CCD-VD pulse occurs at time $T_0+d$.

Imaging of the test pattern begins after an elapsed time $T_W$ from $T_0+d$, to allow the PLL in the video camera 14 to stabilize. As in the first embodiment, a first field is imaged in the interval $T_{C_1}$ from $a_1$ to $b_1$. A second field may also be imaged in the interval $T_{C_2}$ from $a_2$ to $b_2$, but this depends on a condition described below.

Figure 22:
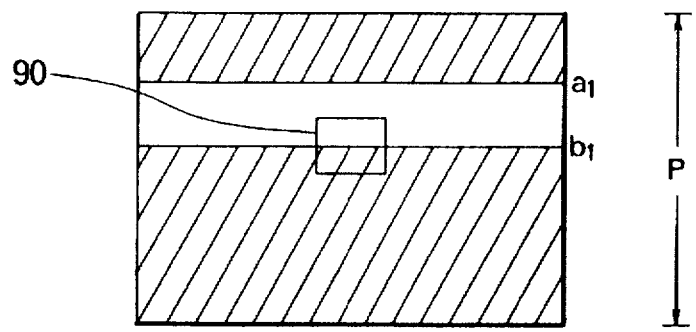
FIGS. 22, 23, and 24 show brightness distributions on a raster-scanned display, further illustrating the operation of the tenth embodiment.
Figure 23:
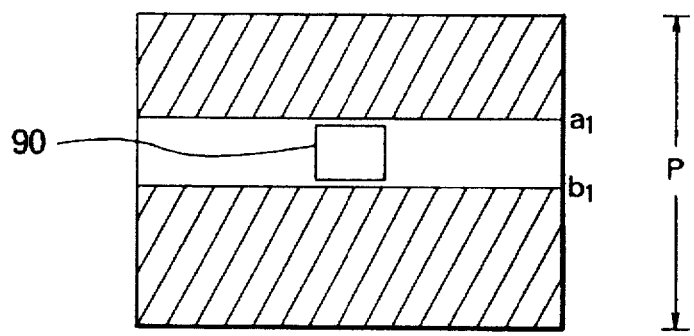
Figure 24:
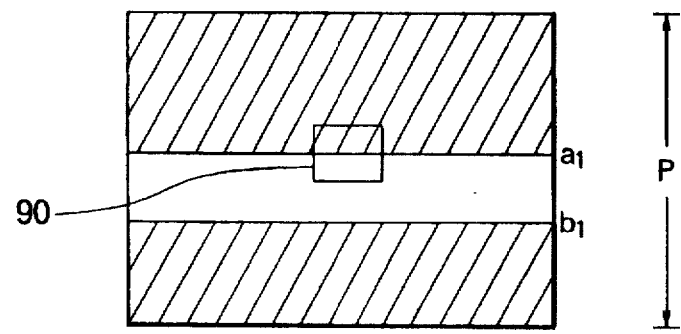

FIGS. 22, 23, and 24 show the positions of the horizontal lines scanned at times $a_1$ and $b_1$ for three different values of the delay d, also indicating the position of the part of the test pattern viewed by the video camera 14. This part will be referred to below as the imaged test pattern 90. The letter P again indicates the height of the raster-scanned display, and cross-hatching indicates the area that is scanned only twice. The area between $a_1$ and $b_1$ is scanned three times.

As d increases, the positions of $a_1$ and $b_1$ move down on the screen 6. The imaged test pattern 90 is crossed by line $b_1$ in FIG. 22, and by line $a_1$ in FIG. 24, but is disposed between lines $a_1$ and $b_1$ in FIG. 23. Thus in FIGS. 22 and 24, part of the imaged test pattern 90 is scanned twice and part is scanned three times, while in FIG. 23, the entire imaged test pattern 90 is scanned three times.

The value of d is calculated so that the entire imaged test pattern 90 receives the same number of scans by the video projector 4 between times $a_1$ and $b_1$. The imaged test pattern 90 may be disposed between the lines scanned at times $a_1$ and $b_1$, as in FIG. 23, or above the upper of these two lines, or below the lower of these two lines. The CPU 18 processes the video data stored in the read-write memory 28 during the interval OUT1 in FIG. 21, obtaining accurate adjustment information from the data pertaining to the imaged test pattern 90, because the imaged test pattern 90 has been uniformly scanned.

If the horizontal lines scanned at times $a_2$ and $b_2$ do not cross the imaged test pattern 90, the CPU 18 may also process the video data obtained during the interval OUT2, which will then also have been scanned a uniform number of times. If either the line scanned at time $a_2$ or the line scanned at time $b_2$ crosses the imaged test pattern 90, however, data processing is confined to the data obtained during interval OUT1.

The delay d may be calculated as follows. With the same notation as in the first embodiment, the positions of $a_1$ and $b_1$ in FIGS. 22 to 24 are given by the following formulas:

$$a_1 = P \times \{[(4 \times t_{CV}) + d] \% t_{PV}\}/t_{PV}$$

$$b_1 = P \times \{[(6 \times t_{CV}) + d] \% t_{PV}\}/t_{PV}$$

Similar formulas give the positions of points $a_2$ and $b_2$ on the screen 6:

$$a_2 = P \times \{[(5 \times t_{CV}) + d] \% t_{PV}\}/t_{PV}$$

$$b_2 = P \times \{[(7 \times t_{CV}) + d] \% t_{PV}\}/t_{PV}$$

The CPU 18 starts by setting the delay d equal to zero, calculates positions $a_1$ and $b_1$ by the formulas given above, and calculates a position J midway between $a_1$ and $b_1$:

$$J = (a_1 + b_1)/2$$

The value of J is next compared with the known vertical position K of the midpoint of the imaged test pattern 90. If K is less than J, as in FIG. 24, the delay d is calculated as follows:

$$d = t_{CV} \times (J - K)/P$$

For a video camera 14 employing the NTSC format, $t_{CV}$ is 16.683 ms, so the value of d in milliseconds is:

$$d = 16.683 \times (J - K)/P \text{ (milliseconds)}$$

If K is greater than J, as in FIG. 22, then d is calculated as follows:

$$d = t_{CV} \times (P + J - K)/P$$

For an NTSC video camera 14, this formula becomes:

$$d = 16.683 \times (P + J - K)/P \text{ (milliseconds)}$$

Next, the CPU 18 uses this new value of d to compute $a_1$ again, and checks whether the horizontal line at position $a_1$ now crosses the imaged test pattern 90. If so, the value of d is further adjusted by subtracting $t_{CV}/2$. If the result is negative, $t_{CV}$ is added to the negative result to obtain a positive value.

When the final delay d has been found, the CPU 18 preferably calculates positions $a_1$ and $b_1$ again, and checks that the lines at these positions do not cross the imaged test pattern. If they do, then the imaged test pattern 90 is too large to be imaged at a single brightness level. The size of the imaged test pattern is accordingly reduced and the above procedure repeated.

This procedure produces a delay d that positions the brightness distribution so that the imaged test pattern 90 is vertically centered in the middle of one area, either the area scanned three times, or the area scanned twice. Following the determination of this delay d, the CPU 18 may use d to calculate $a_2$ and $b_2$ by the formulas given above, check whether the lines scanned at times $a_2$ and $b_2$ cross the imaged test pattern 90, and thereby decide whether or not the second field of video data, obtained at time OUT2 in FIG. 21, is usable.

The CPU 18 then commands the synchronizing signal generator 16 to reset with the calculated delay d from the first vertical synchronizing signal VP-VD, and commands the read-write memory 28 to store the video data output in interval OUT1 in FIG. 21, or the video data output in intervals OUT1 and OUT2 if the second field is usable. These data can be processed to obtain accurate adjustment information.

If the second field is not usable, the test pattern can be imaged twice to obtain both fields. First a delay d calculated as described above is used to obtain the first field of video data during interval OUT1. Next a new delay d' is calculated, using $a_2$ and $b_2$ instead of $a_1$ and $b_1$, and the synchronizing signal generator 16 is commanded to reset CCD-VD at this new delay d' with respect to VP-VD to obtain a second field of video data during interval OUT2.

After processing the video data thus obtained, the CPU 18 commands the video projector 4 to display a different test pattern, or commands the motor controller 64 to point the video camera 14 at a different part of the screen 6, or takes both of these actions, and calculates a new delay to obtain more test-pattern data.

Figure 25:
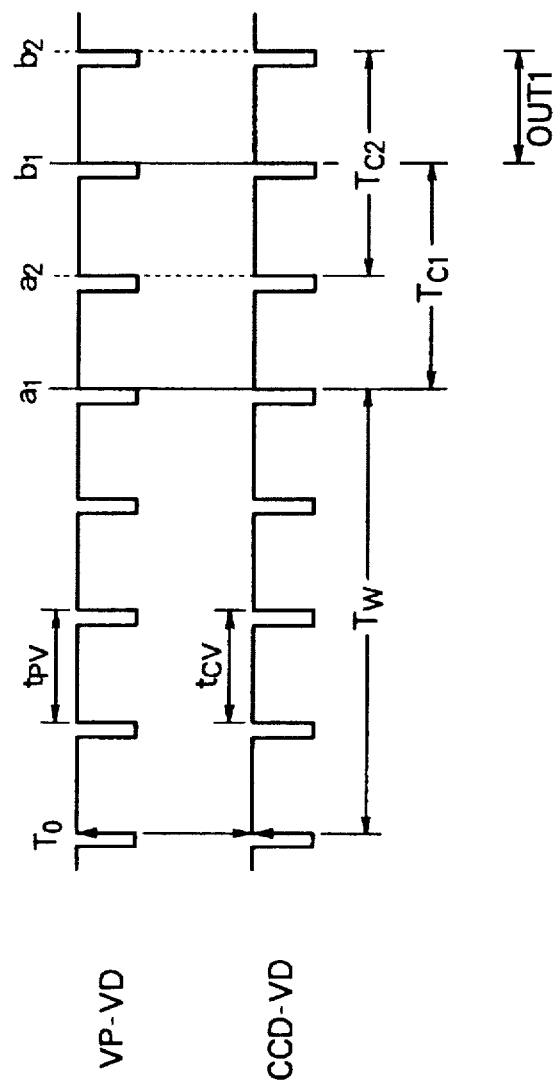
FIG. 25 is a timing diagram illustrating the operation of the tenth embodiment for equal vertical scanning frequencies.

If the vertical scanning frequency $f_{VSIG}$ measured by the frequency counter 12 is equal to the vertical scanning frequency $f_{VCCD}$ of the video camera 14, the CPU 18 does not perform any of the calculations described above, but simply commands the synchronizing signal generator 16 to reset the vertical synchronizing signal CCD-VD at a time $T_0$ before each test pattern is imaged. Referring to FIG. 25, this reset aligns the CCD-VD and VP-VD pulses so that the points $a_1$, $b_1$, $a_2$, and $b_2$ coincide with the top of the screen 6, and so that photocharges in the CCD can be transferred to the output registers during the vertical blanking interval of the video projector 4.

The vertical blanking interval of the video projector 4 provides a buffer interval that can absorb small amounts of inaccuracy in the timing of the vertical synchronizing signals. Accurate data can thus be obtained for all fields, including the field read out during interval OUT1 in FIG. 25 and other subsequent fields.

Figure 26:
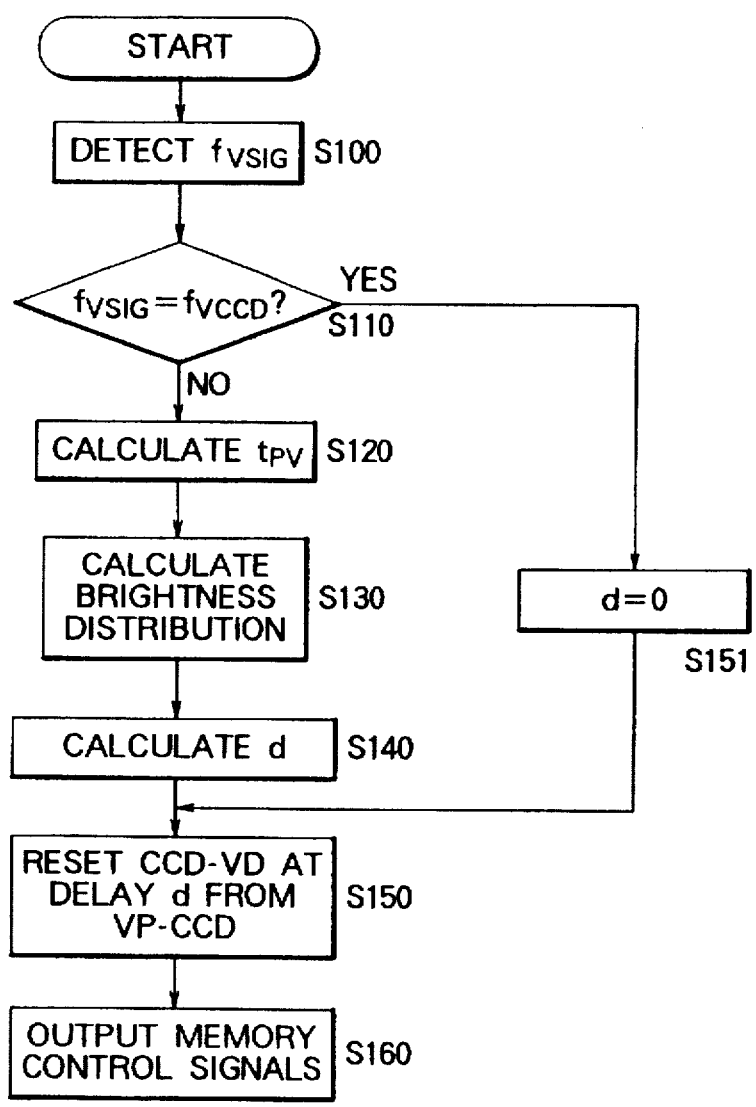
FIG. 26 is a flowchart illustrating the operation of the tenth embodiment.

FIG. 26 illustrates the operation of the tenth embodiment in flowchart form. In step S100, the frequency counter 12 detects the vertical scanning frequency $f_{VSIG}$ of the video projector 4. In step S110, the CPU 18 compares $f_{VSIG}$ with $f_{VCCD}$. If $f_{VSIG}$ and $f_{VCCD}$ are unequal, the CPU 18 calculates $t_{PV}$ in step S120, calculates the brightness distribution (e.g. the values of $a_1$ and $b_1$) in step S130, calculates the delay d in step S140, and commands the synchronizing signal generator 16 to reset CCD-VD at delay d from VP-VD in step S150. If $f_{VSIG}$ and $f_{VCCD}$ are equal, steps S120, S130, and S140 are skipped, d is set equal to zero, and in step S150 the synchronizing signal generator 16 resets CCD-VD so that CCD-VD and VP-VD are mutually synchronized. Following step S150, in step S160 the CPU 18 outputs memory control signals to store video data in the read-write memory 28.

As one variation of the tenth embodiment, the video camera 14 may be capable of operating in different standard television modes (such as NTSC, PAL, SECAM, and HDTV). If the frequency $f_{VSIG}$ matches any one of these modes, the CPU 18 issues a command that sets the video camera 14 to the matching mode, and sets the delay d to zero.

As another variation, the video camera 14 may image the entire screen. In this case the CPU 18 processes only one part of the image stored in the read-write memory 28, and calculates a delay d that positions the brightness distribution so that the processed part of the image lies in an area that is uniformly scanned.

As still another variation, if the imaging system 2 will only be used to test and adjust video projectors operating at a single known vertical scanning frequency, the frequency counter 12 can be omitted, and the CPU 18 can simply command the synchronizing signal generator 16 to reset CCD-VD at calculated delays d from VP-VD. If the known vertical scanning frequency of the video projector 4 matches the vertical scanning frequency of the video camera 14, the delay calculations can be skipped and the delay d set to zero.

As yet another variation, the tenth embodiment can be used to test and adjust a device such as a television set or computer monitor that produces a direct-view raster-scanned display, instead of a projection display.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An imaging system for imaging a raster-scanned display having a first vertical scanning frequency, said raster-scanned display being produced by a display system that also produces a first vertical synchronizing signal having said first vertical scanning frequency, comprising:

an imaging device operating at a second vertical scanning frequency, for converting an optical image, in which at least part of said raster-scanned display appears, to a video signal;

a synchronizing signal generator coupled to said imaging device, for receiving said first vertical synchronizing signal, generating a second vertical synchronizing signal with said second vertical scanning frequency, resetting said second vertical synchronizing signal so that said second vertical synchronizing signal is synchronized with said first vertical synchronizing signal at a designated time, and supplying said second vertical synchronizing signal to said imaging device;

a central processing unit for calculating, from said first vertical scanning frequency and said second vertical scanning frequency, data defining a two-valued compensation function, and for notifying said synchronizing signal generator of said designated time;

a compensation signal generator coupled to said central processing unit, for generating a compensation signal responsive to said data defining a two-valued compensation function; and a multiplier coupled to said imaging device and said compensation signal generator, for multiplying said video signal by said compensation signal, thereby generating a compensated video signal free of brightness differences due to a difference between said first vertical scanning frequency and said second vertical scanning frequency.

2. The imaging system of claim 1, further comprising a frequency counter for receiving said first vertical synchronizing signal from said display system and measuring said first vertical scanning frequency.

3. The imaging system of claim 2, further comprising a switch coupled to said imaging device and said multiplier, for selecting said video signal when said first vertical scanning frequency is equal to said second vertical scanning frequency, selecting said compensated video signal when said first vertical scanning frequency is not equal to said second vertical scanning frequency, and outputting the signal thus selected.

4. The imaging system of claim 1, wherein the compensation signal generated by said compensation signal generator is also responsive to a plurality of correction factors that compensate for a brightness gradient between central and peripheral parts of said raster-scanned display.

5. The imaging system of claim 4, wherein said display system displays a predetermined image on said raster-scanned display, and said central processing unit calculates said correction factors responsive to the video signal output by said imaging device when said predetermined image is displayed.

6. The imaging system of claim 4, wherein said display system projects said raster-scanned display onto a screen, and said central processing unit calculates said correction factors responsive to projection angles of said raster-scanned display on said screen.

7. The imaging system of claim 4, further comprising a read-only memory, wherein said correction factors are pre-stored in said read-only memory.

8. The imaging system of claim 1, further comprising a lens with a zoom mechanism for magnifying part of said raster-scanned display, wherein said compensation signal is responsive to a position of the part thus magnified.

9. The imaging system of claim 1, wherein said raster-scanned display forms part of a scene imaged by said imaging system, and said compensation signal generator generates, as said compensation signal, a compensation signal that has a fixed value in parts of said scene not occupied by said raster-scanned display.

10. The imaging system of claim 1, further comprising a read-write memory coupled to said multiplier, for storing said compensated video signal, starting at a predetermined elapsed time from said designated time.

11. The imaging system of claim 9, further comprising an interface circuit for communication between said display system and said central processing unit, wherein:

said display system displays a test pattern on said raster-scanned display; and said central processing unit sends adjustment information via said interface circuit to said display system, responsive to the compensated video signal stored in said read-write memory when said test pattern is displayed.

12. The imaging system of claim 11, wherein said test pattern occupies all of said raster-scanned display.

13. The imaging system of claim 11, further comprising:
   a lens with a zoom mechanism controlled by said central processing unit; and
   a pointing mechanism controlled by said central processing unit, for aiming said imaging device.

14. The imaging system of claim 13, wherein said test pattern occupies only part of said raster-scanned display, said central processing unit locates said test pattern in said raster-scanned display by processing the compensated video signal stored in said read-write memory, and said central processing unit controls said zoom mechanism and said pointing means so that said imaging device is aimed at said test pattern and said zoom mechanism magnifies said test pattern.

15. An imaging system for imaging a test pattern displayed in an arbitrary position on one part of a raster-scanned display produced by a display system having a first vertical scanning frequency, said display system also producing a first vertical synchronizing signal having said first vertical scanning frequency, comprising:
   an imaging device operating at a second vertical scanning frequency for converting an optical image of said test pattern to a video signal;
   a synchronizing signal generator coupled to said imaging device, for receiving said first vertical synchronizing signal, generating a second vertical synchronizing signal with said second vertical scanning frequency, resetting said second vertical synchronizing signal so that said second vertical synchronizing signal has a designated delay with respect to said first vertical synchronizing signal at a designated time, and supplying said second vertical synchronizing signal to said imaging device;
   a central processing unit for calculating said designated delay, responsive to said first vertical scanning frequency, said second vertical scanning frequency, and the position of said test pattern; and
   a read-write memory coupled to said imaging device, for storing said video signal, starting at a predetermined elapsed time from said designated time
   wherein from said first vertical scanning frequency and said second vertical scanning frequency, said central processing unit calculates a brightness distribution that shifts vertically on said raster-scanned display responsive to said designated delay, said brightness distribution dividing said raster-scanned display into a first part having one brightness value and a second part having another brightness value, and wherein said designated delay places said test pattern within said first part of said raster-scanned display.

16. The imaging system of claim 15, further comprising a frequency counter for receiving said first vertical synchronizing signal from said display system and measuring said first vertical scanning frequency.

17. The imaging system of claim 16, wherein said central processing unit sets said designated delay to zero when said first vertical scanning frequency is equal to said second vertical scanning frequency.

18. The imaging system of claim 15, further comprising an interface circuit for communication between said display system and said central processing unit, wherein said central processing unit sends adjustment information via said interface circuit to said display system, responsive to the video signal stored in said read-write memory when said test pattern is displayed.

* * * * *